United States Patent
Khoshnevis

(10) Patent No.: US 10,907,375 B2
(45) Date of Patent: Feb. 2, 2021

(54) AUTOMATED CONSTRUCTION OF TOWERS AND COLUMNS

(71) Applicant: University of Southern California, Los Angeles, CA (US)

(72) Inventor: Behrokh Khoshnevis, Marina Del Rey, CA (US)

(73) Assignee: University of Southern California, Los Angeles, CA (US)

( * ) Notice: Subject to any disclaimer, the term of this patent is extended or adjusted under 35 U.S.C. 154(b) by 104 days.

(21) Appl. No.: 16/121,545

(22) Filed: Sep. 4, 2018

(65) Prior Publication Data

US 2018/0371785 A1   Dec. 27, 2018

Related U.S. Application Data

(63) Continuation of application No. 14/688,676, filed on Apr. 16, 2015, now Pat. No. 10,066,413.

(60) Provisional application No. 61/980,428, filed on Apr. 16, 2014.

(51) Int. Cl.
| | |
|---|---|
| *B33Y 30/00* | (2015.01) |
| *E04H 12/34* | (2006.01) |
| *E04G 21/04* | (2006.01) |
| *E04H 12/16* | (2006.01) |

(52) U.S. Cl.
CPC ............ *E04H 12/341* (2013.01); *B33Y 30/00* (2014.12); *E04G 21/0463* (2013.01); *E04H 12/16* (2013.01)

(58) Field of Classification Search
CPC ... E04H 12/341; B33Y 30/00; E04G 21/0463; B29C 64/00; B29C 6400/10; B29C 64/106
See application file for complete search history.

(56) References Cited

U.S. PATENT DOCUMENTS

| | | | |
|---|---|---|---|
| 3,853,346 | A | 12/1974 | Jobst et al. |
| 4,831,316 | A | 5/1989 | Ishiguro et al. |
| 7,153,454 | B2 | 12/2006 | Khoshnevis |
| 7,452,196 | B2 | 11/2008 | Khoshnevis |
| 7,574,925 | B2 | 8/2009 | Khoshnevis |

(Continued)

OTHER PUBLICATIONS

International Search Report dated Jul. 8, 2015 for corresponding International Application No. PCT/US2015/026187 filed Apr. 16, 2015; total 2 pages.

(Continued)

*Primary Examiner* — Joseph S Del Sole
*Assistant Examiner* — John Robitaille
(74) *Attorney, Agent, or Firm* — Snell & Wilmer L.L.P.

(57) ABSTRACT

A robot may extrude a tower or column. The robot may include an extrusion nozzle, a positioning system, a climbing apparatus, and a controller. The extrusion nozzle may controllably extrude uncured construction material. The positioning system may controllably cause the extrusion nozzle to traverse a perimeter layer of the tower or column. A climbing apparatus may controllably cause the robot to climb. A controller may autonomously: direct the positioning system to cause the nozzle to traverse the perimeter layer of the tower or column; direct the nozzle to extrude uncured construction material during the traverse; direct the climbing apparatus to cause the robot to climb an incremental amount; and repeat each of the foregoing positioning, extrusion, and climbing steps until the extruded tower or column attains a desired height.

18 Claims, 18 Drawing Sheets

(56) References Cited

U.S. PATENT DOCUMENTS

| | | | |
|---|---|---|---|
| 7,641,461 | B2 | 1/2010 | Khoshnevis |
| 7,814,937 | B2 | 10/2010 | Khoshnevis |
| 7,837,378 | B2 | 11/2010 | Khoshnevis |
| 7,841,849 | B2 | 11/2010 | Khoshnevis |
| 7,841,851 | B2 | 11/2010 | Khoshnevis |
| 7,874,825 | B2 | 1/2011 | Khoshnevis |
| 7,878,789 | B2 | 2/2011 | Khoshnevis |
| 8,029,258 | B2 | 10/2011 | Khoshnevis |
| 8,029,710 | B2 | 10/2011 | Khoshnevis |
| 8,201,787 | B2 | 6/2012 | Ingram et al. |
| 8,308,470 | B2 | 11/2012 | Khoshnevis |
| 8,518,308 | B2 | 8/2013 | Khoshnevis |
| 8,568,121 | B2 | 10/2013 | Khoshnevis |
| 8,801,415 | B2 | 8/2014 | Khoshnevis |
| 8,863,773 | B2 | 10/2014 | Khoshnevis |
| 8,944,799 | B2 | 2/2015 | Khoshnevis |
| 8,992,679 | B2 | 3/2015 | Khoshnevis |
| 2012/0131880 | A1 | 5/2012 | Delago et al. |
| 2013/0228397 | A1 | 9/2013 | Horn |
| 2014/0271961 | A1 | 9/2014 | Khoshnevis |
| 2015/0252582 | A1 | 9/2015 | Stiesdal |

OTHER PUBLICATIONS

Written Opinion of the International Searching Authority dated Jul. 8, 2015 for corresponding International Application No. PCT/US2015/026187 filed Apr. 16, 2015; total 6 pages.

International Preliminary Report on Patentability dated Oct. 18, 2016 for corresponding International Application No. PCT/US2015/026187 filed Apr. 16, 2015; total 7 pages.

Wikipedia. 2012. Slip Forming. (Article captured Jul. 27, 2012 and downloaded from http://web.archive.org/web/20120727190219/http://en.wikipedia.org/wiki/Slip_forming).

Non-Final Office Action dated Jun. 2, 2017 for corresponding U.S. Appl. No. 14/688,676, filed Apr. 16, 2015; total 16 pages.

Notice of Allowance dated Jun. 8, 2018 for corresponding U.S. Appl. No. 14/688,676, filed Apr. 16, 2015; total 8 pages.

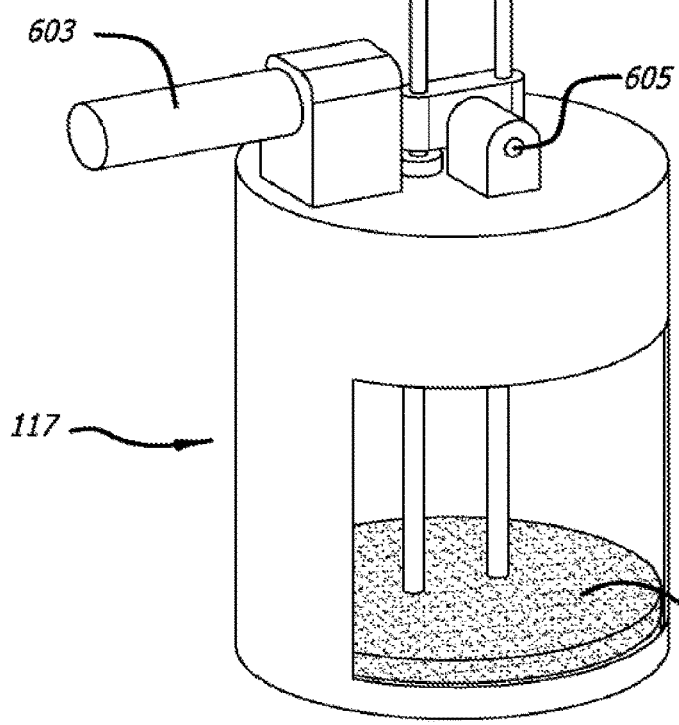
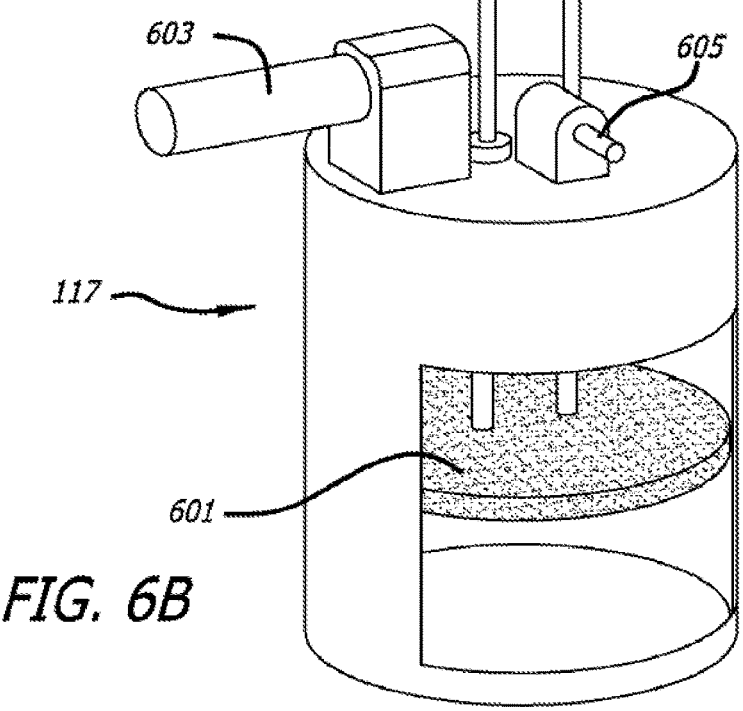
FIG. 6A
FIG. 6B

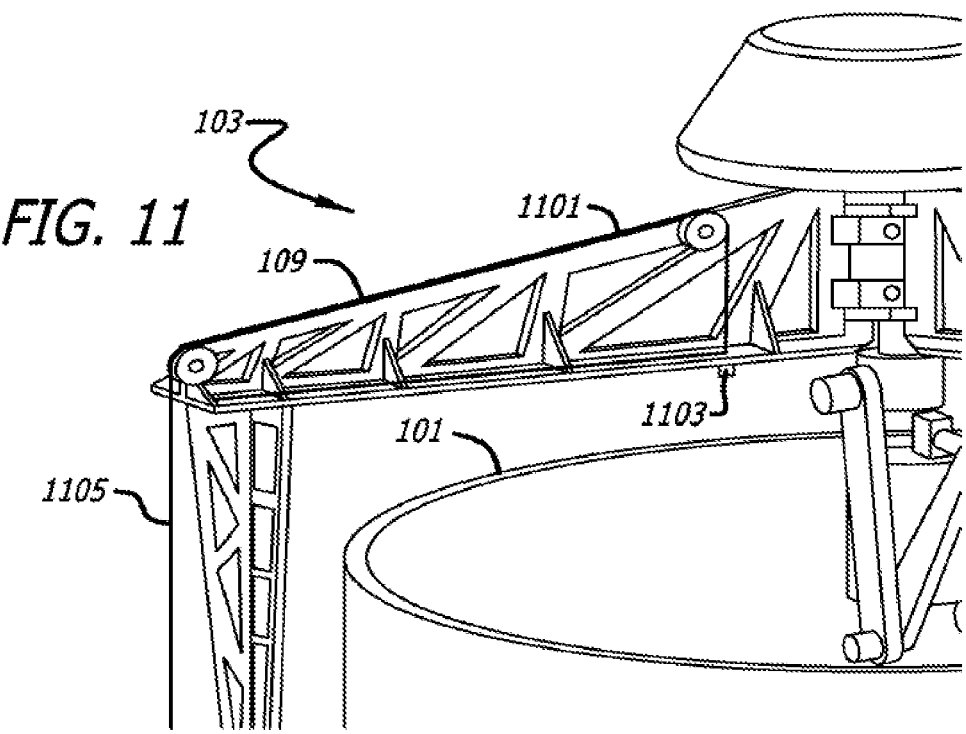
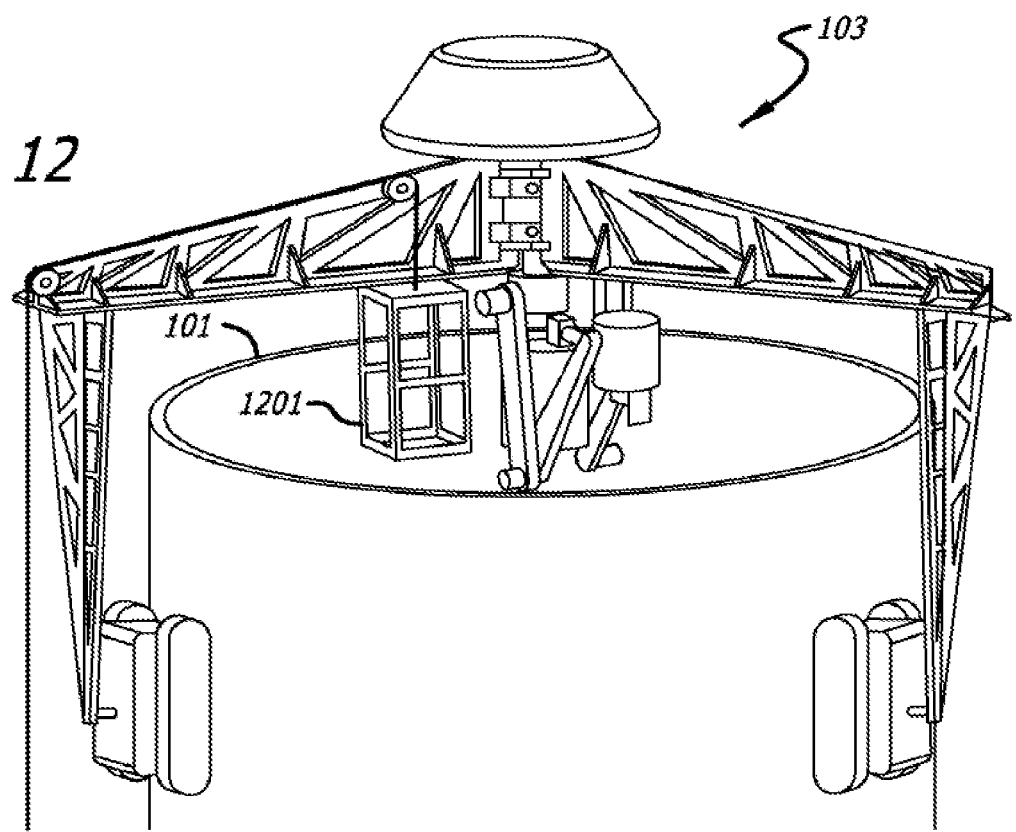

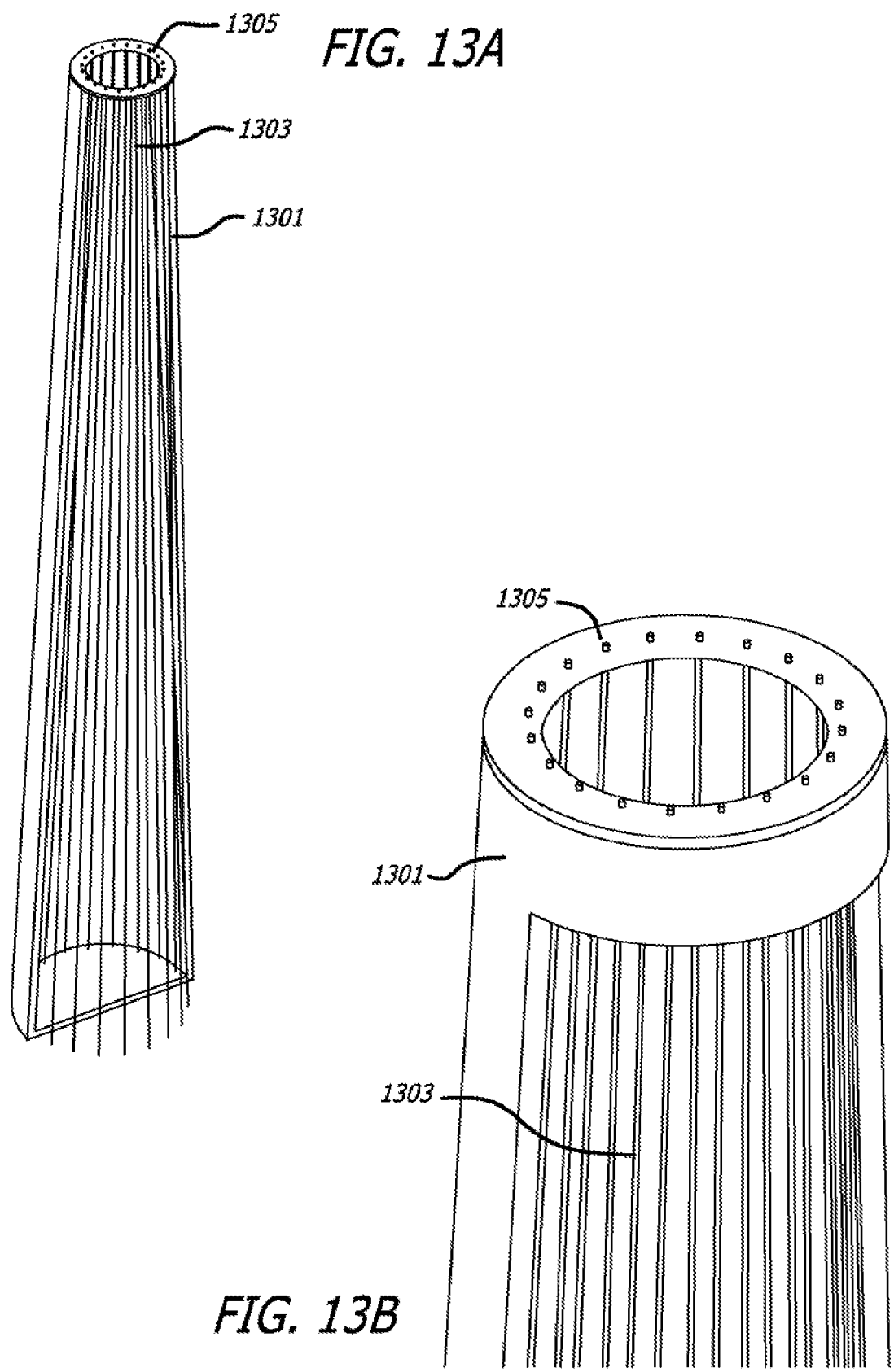

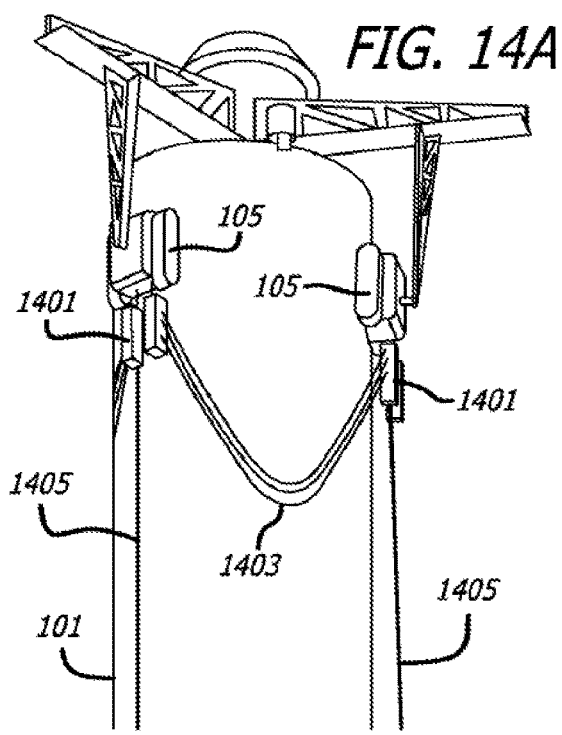
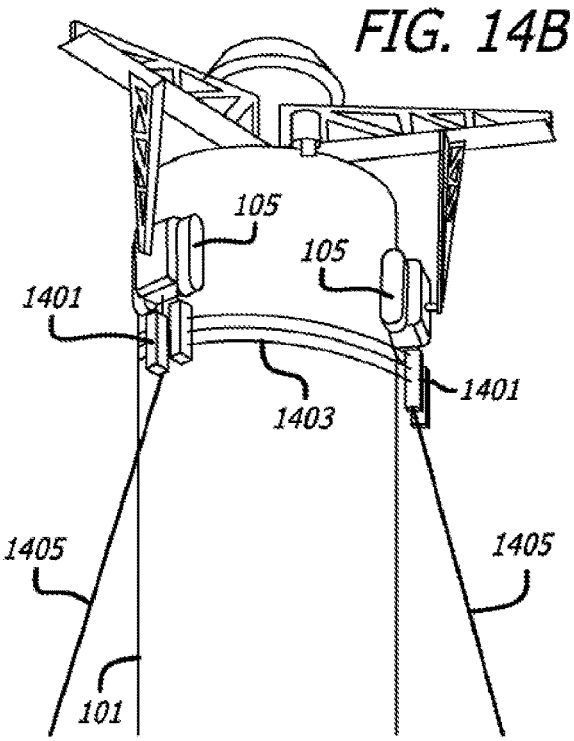
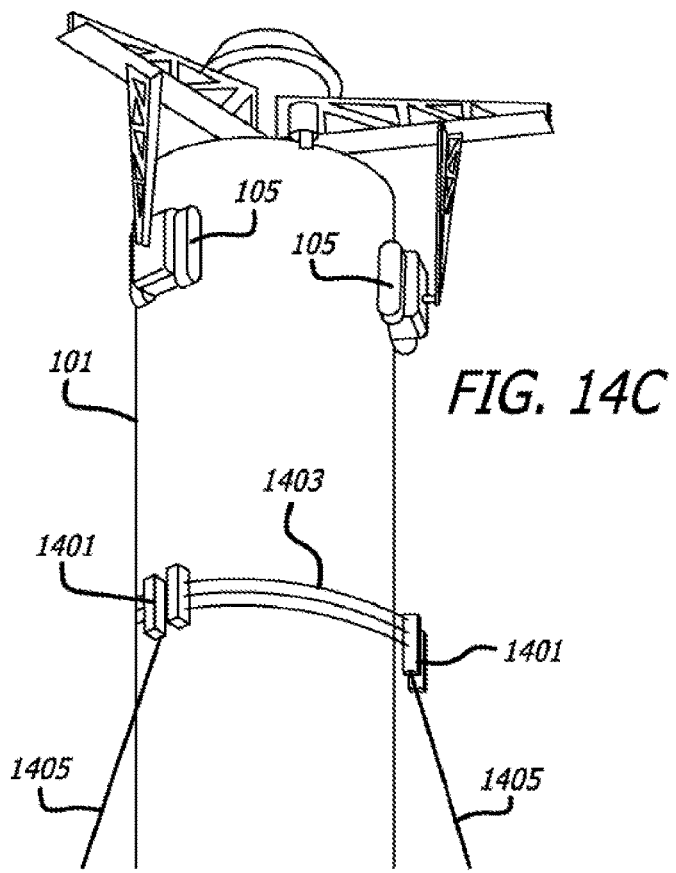

AUTOMATED CONSTRUCTION OF TOWERS AND COLUMNS

CROSS-REFERENCE TO RELATED APPLICATIONS

This patent application is a continuation of U.S. patent application Ser. No. 14/688,676, filed Apr. 16, 2015, now U.S. Pat. No. 10,066,413, which claims the benefit of U.S. Provisional Patent Application No. 61/980,428, filed Apr. 16, 2014, which applications are incorporated herein by reference in their entirety.

BACKGROUND

Technical Field

This disclosure relates to the construction of towers and columns, such as towers that support wind turbines and columns, pylons that support bridges, and silos and chimneys.

Description of Related Art

Wind turbine towers have been constructed using hollow steel segments that are produced at factories, transported to sites at great cost, and assembled using special cranes. The construction can be very hazardous, as it may be performed at high elevation, sometimes under strong wind, and in a tight work environment. Falling, getting cut between heavy steel segments, and being hit by a crane, its load, or accessories are among the many possible hazards.

A wind turbine tower assembly may include a foundation, a tower, a nacelle (generator, gearbox, drive train, and brake system), a yaw (which may keep blades facing the wind) and a rotor (blades, a hub, and a nose cone). The tower may be the most expensive part of the wind turbine assembly (about $500K). Large steel sections of the tower may have to be transported from a factory to a wind farm for installation. They may be classified as a wide load which may require special transportation considerations. The problems may be accentuated by a desire for taller towers that can reach stronger wind elevations.

Current methods of tower construction may make it particularly difficult to build very tall towers, as it can be very expensive to build cranes that can reach heights greater than 85 to 100 meters. Also, taller towers may require a large base segment that can be hard to transport in view of width limitations in roads and height limits imposed by overpasses. Large cranes may also require wider roads at the wind farm to deliver. Currently, the cost of road construction at hilly wind farms can be very high (e.g., about $30 M for a wind farm having about 100 installations).

SUMMARY

A robot may extrude a tower or column. The robot may include an extrusion nozzle, a positioning system, a climbing apparatus, and a controller. The extrusion nozzle may controllably extrude uncured construction material. The positioning system may controllably cause the extrusion nozzle to traverse a perimeter layer of the tower or column. A climbing apparatus may controllably cause the robot to climb. A controller may autonomously: direct the positioning system to cause the nozzle to traverse the perimeter layer of the tower or column; direct the nozzle to extrude uncured construction material during the traverse; direct the climbing apparatus to cause the robot to climb an incremental amount; and repeat each of the foregoing positioning, extrusion, and climbing steps until the extruded tower or column attains a desired height.

The controller may direct the positioning system to cause the nozzle to traverse multiple perimeter layers of the tower or column, each on top of a previously-extruded layer, before directing the climbing apparatus to cause the robot to climb the wall of the tower in an incremental amount.

The climbing apparatus may include multiple rovers, such as two, three or more, each having one or more rotating tracks, which may be made of rubber.

Each rover may have at least two independently-operable rubber tracks.

Each rover may be supported by a substantially vertical truss attached to a substantially horizontal truss that collectively press each rover against a substantially vertical surface to be climbed.

Each vertical truss may be slidably engaged to each vertical truss. The robot may include a cable that controllably pulls inwardly on each vertical truss so as to cause each rover to press against the wall of the tower or column.

The climbing apparatus may have a configuration that climbs by grabbing onto an exterior wall of the tower or column or onto a structure inside of the tower or column. The robot may be configured to extrude the structure inside of the tower or column in layers, each at approximately the same time as the robot extrudes a layer of the tower or column.

The robot may include a material container and a hoist that controllably transports the material container between ground and the top of the tower or column.

The robot may include an automated material transfer apparatus that transfer material from the material container to the extrusion nozzle under the control of the controller.

The material container may include an internal piston that forces out material within the container when moved. The hoist may include a cable connected to the material container and the piston may be connected to the cable.

The material container may include a controllable lock that prevents movement of the piston in response to force applied to the cable when locked and permits movement of the piston in response to force applied to the cable when unlocked.

The robot may include an articulated arm that controls the location of the extrusion nozzle. The articulated arm may controllably move the extrusion nozzle both vertically and horizontally.

The positioning system may include a laser that provides a fixed position reference beam of light.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIGS. 6A and 6B illustrate details of the example of the bucket shown in FIG. 5 with a portion of its side wall cut away to reveal an interior view.

FIGS. 11 and 12 show an alternate approach for sending an operator to the top of the tower for possible servicing of various system components inside of the tower.

FIGS. 13A and 13B illustrates an example of a tower that has been completed using the robot (not shown in FIG. 13) and that has tensioning cables attached to it.

FIGS. 14A-14C illustrate arrangements that may be used to support the tower by guy wires as it is being constructed in the presence of a strong wind.

DETAIL DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Robots that autonomously construct tall concrete towers will now be described. These may be used in connection with any type of tower or column, including one that supports a wind turbine.

A robot that constructs such towers may include a set of coordinated vertically climbing rovers, an extrusion nozzle assembly, an electronic motion controller, and a cementitious material delivery system. Such a system may be used to construct all types of concrete towers, chimneys, silos, water tanks, and tall columns (such as bridge columns). Examples of such robots are now described.

The approach may use concrete and automatically construct towers using a robotic system that can climb the tower as it is being constructed. The robotic system may keep the construction equipment that it carries well aligned and in such a way that the final tower ends up having near-perfect geometry and orientation with respect to the horizon. Sensors, such as GPS sensors, accelerometers, and/or gyroscopes may be used to aid in this alignment.

Advantages of this approach may include fully autonomous operation, usage of extruded concrete that eliminates the need for factory work on steel segments (to be used as tower material or as slip cast components to be used in conventional construction of such structures out of concrete) and difficult transportation, safe operation due to elimination of human tasks at risky elevations and windy conditions, low cost of material transportation, and the ability to build very tall towers (e.g., more than 150 or 200 meters).

Figure 1:
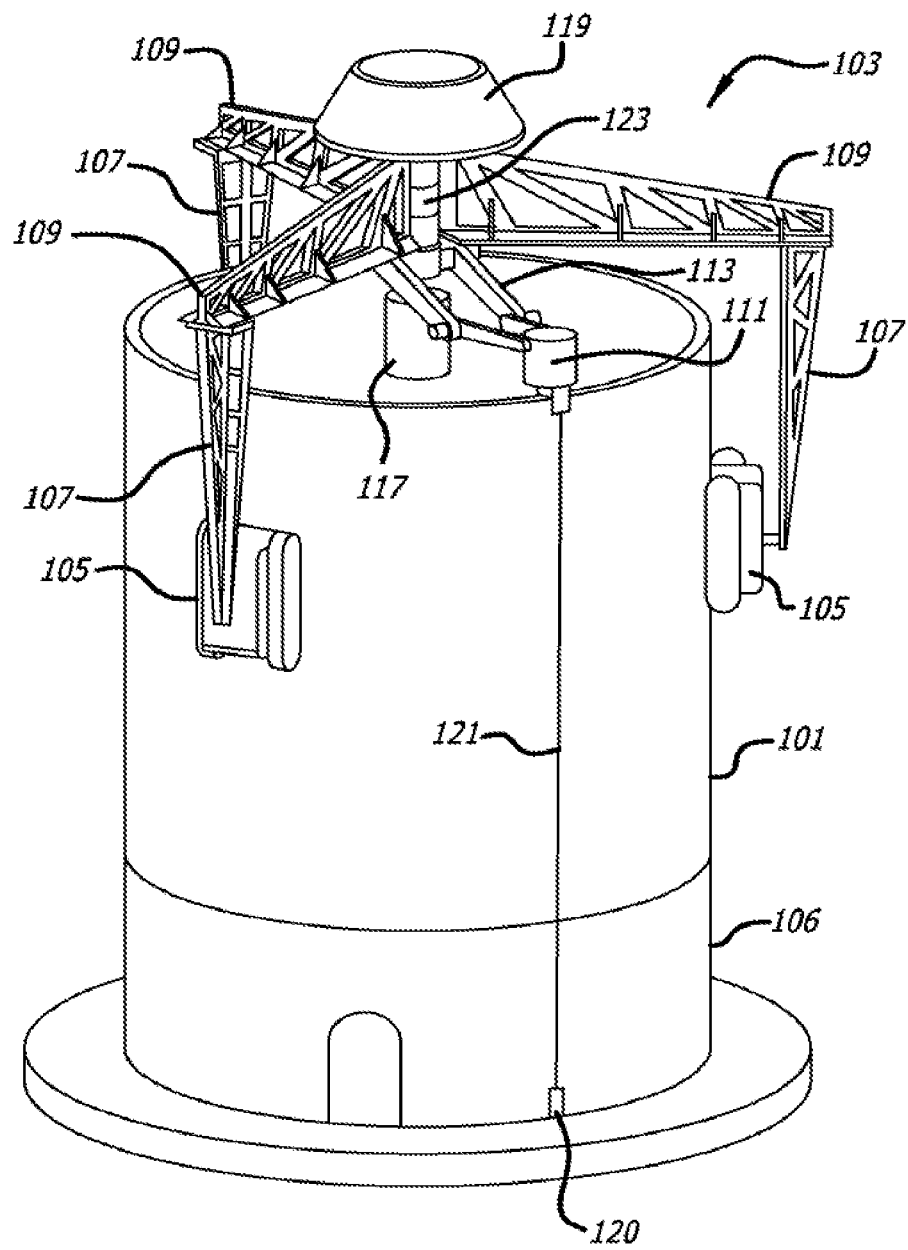
FIG. 1 illustrates am example of a tower being constructed by an example of a robot.

FIG. 1 illustrates an example of a tower 101 being constructed by an example of a robot 103. As illustrated in FIG. 1, the robot may include multiple rovers 105 (three in this example, one of which is behind the tower 101 in the illustration), multiple vertical trusses 107 (three in this example) that each support one of the rovers, multiple horizontal trusses 109 (three in this example) that each support one of the vertical trusses, an extrusion nozzle 111, an articulated arm 113 connected to the extrusion nozzle 111, a bucket 117, a component compartment 119, and a laser source 120.

Each rover 105 may be configured to controllably move up and down the tower 101 and/or in other directions while being pressed against the tower 101 by its associated vertical truss 107 and horizontal truss 109. Each rover 105 may include two rotating, circular, drive tracks (belts) that may be made of a soft material, like rubber, so as to have high friction with the surface of tower 101. Each rotating drive track may be separately controlled by a motor inside of each rover 105. Each motor may be controlled by a controller (not shown). The controller may be configured to control each motor in each rover 105 so as to cause each rover 105 to move in one or more of the ways described herein.

The extrusion nozzle 111 may be configured to extrude construction material on the upper perimeter edge of the tower 101 that is being built. The extrusion nozzle 111 may be configured to extrude any type of construction material that may be useful in the formation of the tower 101, such as uncured cementitious material, or uncured polymers. The extrusion nozzle 111 may include a storage compartment above the nozzle for storing a batch of uncured material. The extrusion nozzle 111 may include a valve that may control when the extrusion nozzle 111 extrudes material which may be controlled by the controller to cause the extrusion nozzle to extrude material only when needed. The extrusion nozzle 111 may include a pump that pumps material through an extrusion orifice in the nozzle.

The articulated arm 113 may be configured to controllably move the extrusion nozzle 111 to various locations, including horizontally around the circumference of the top edge of the tower 101 that is being built and vertically. The articulated arm 113 may be configured to controllably move the extrusion nozzle 111 to other locations, such as to the bucket 117. The articulated arm 113 may be controlled by the controller so as to cause the articulated arm 113 to controllably move around the circumference of the top edge of the tower 101, as well as to the other locations.

The laser 120 may rest at a fixed location on the ground and emit a vertical laser beam 121 that may be received by a sensor (not shown) mounted on the extrusion nozzle 111. The direction of the beam may be titled to corresponding to any desired tilt in the vertical wall of the tower 101. Information from the sensor may be provided to the controller, thus enabling the controller to know when the extrusion nozzle 111 has been positioned directly above the vertical laser beam 121. The vertical laser beam 121 may thus serve as a reference point with respect to ground that remains fixed, notwithstanding movement of the robot 103, and may be used by the controller to aid in the positioning of the extrusion nozzle 111.

The tower 101 may include a foundation 106. Both may be constructed before the size of the tower is increased by material being extruded by the extrusion nozzle 111 as the extrusion nozzle is rotated by the articulated arm 113 around the upper perimeter of the tower 101 under the control of the controller. The base segment of the tower 101 may be conventionally built on the foundation 106 and may initially be slightly more than the height of each vertical axis 107.

The base segment of the tower 101 and the foundation 106 may both be monolithic and built by means of conventional concrete casting using concrete molds, similar to the way wind tower foundations are commonly built today. The base segment may function as an initial tower to provide a starting wall for the rovers to press against and move the system upward as the rest of the tower is constructed. Alternatively, the foundation 106 and the tower 101 may be constructed by the robot 103, while the vertical trusses 107 of the robot 103 are removed and replaced by short vertical posts (not shown) resting on the ground below. The foundation 106 and/or the tower 101 may include one or more openings that permit access to the interior of the tower, such as an opening 122.

The horizontal trusses 109 may be attached to a central vertical pole 123. One of the horizontal trusses 109 may be rigidly affixed to the central vertical pole 123, while the others may be permitted to rotate in a horizontal plane about the central vertical pole 123. The angles between the multiple horizontal trusses 109 may be kept substantially equal by the controller by controlling the position of each rover around the tower. When three are used, for example, the angles may each be about 120 degree.

Figure 2:
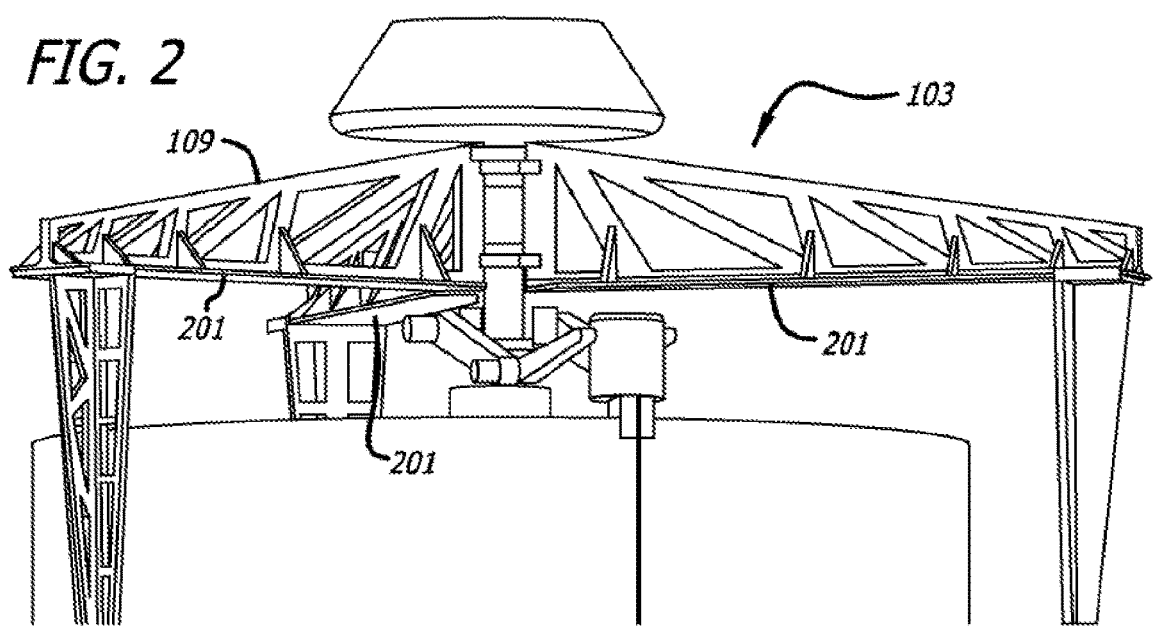
FIG. 2 illustrates an enlarged view of a portion of the tower and the robot and better illustrates cables that may pull on the vertical trusses under the control of the controller, causing them to slide inwardly in tracks in the corresponding horizontal trusses that support them.

FIG. 2 illustrates an enlarged view of a portion of the tower 101 and the robot 103 and better illustrates cables 201 that may pull on the vertical trusses 107 under the control of the controller, causing them to slide inwardly in tracks in the corresponding horizontal trusses 109 that support them. This pulling may cause their respective rovers 105 to be pressed tightly against the exterior wall of the tower 101. One or more motorized winches (not shown, but could be in component compartment 119) under the control of the controller may effectuate this pulling and ensure that each of the vertical trusses 107 are equally distant from the central access of the tower 101. An idler pulley may be used at the bottom of the central vertical pole 123 to provide a 90 degree deflection to the cables to direct them to the winch and may also be located in the component compartment 119.

The controller may be configured to cause the articulated arm 113 to position the extrusion nozzle 111 immediately above the upper rim of the tower 101 and to then rotate around this upper rim while directing the extrusion nozzle 111 to extrude material. This may cause an additional layer of material to be extruded on top of the existing rim of the tower 101. The controller may be configured to next cause the articulated arm 113 to raise the extrusion nozzle 111 immediately above the last layer that was extruded and to then cause the extrusion nozzle 111 to extrude a further layer in the same way.

This process may repeat until the articulated arm reaches its highest possible point. At this point, the controller may command the rovers 105 to crawl up along the exterior wall of the tower 101 by a predetermined incremental amount. After the robot 103 completes this crawl, the controller may command the articulated arm 113 to move to its lowest position and to then command the articulate arm 113 and the extrusion nozzle 103 to extrude the next set of layers in the same way.

In an alternate configuration, the controller may command the articulated arm 113 to rotate the extrusion nozzle 111 in a spiral pattern, rather than to remain in the same horizontal plane and then incrementally raise the extrusion nozzle 111 after each layer is deposited.

In an alternate configuration, the controller may not command the articulated arm 113 to raise the extrusion nozzle 111 after it extrudes a layer, but may instead command the rovers 105 to crawl up the wall of the tower 101 after each extruded layer in an incremental amount.

The controller may cause one of these processes to repeat until the tower reaches a desired height.

The robot 103 may include sensors, such as accelerometers, gyroscopes, and GPS modules which may be located in the main component compartment 119 positioned on top of the central pole, that detect the location and movement of the rovers 105. Based on this information, the controller may cause all of the rovers 105 to be at the same horizontal level after each vertical crawl or vertical movement of the articulated arm 113.

The storage compartment in the extrusion nozzle 111 may be sufficient to store enough material to extrude all or part of a single layer or more.

The extrusion nozzle 111 may include one or more trowels, such as one on each side of the extrusion nozzle, oriented to smooth out the side surfaces of each extruded layer. The extrusion nozzle may be of any type, such as any of the types disclosed in U.S. Pat. No. 7,878,789, the content of which is incorporated herein by reference.

As shown in FIG. 2, the vertical laser beam 121 may shoot upward alongside the wall of the tower 101 at a specified angle of incline, which may correspond to the tower wall vertical angle. A sensor under the extrusion nozzle 111 may detect the laser as the extrusion nozzle is rotated around by the articulated arm 113 and thus register the beginning of each new layer with the controller, regardless of the lateral positions of the rovers 105 (and the vertical trusses 107 to which they are connected). Thus, the rovers 105 may initially drift sideways without any appreciable impact on the accuracy of the construction, hence making the initial lateral position of the rovers 105 inconsequential.

Figure 3:
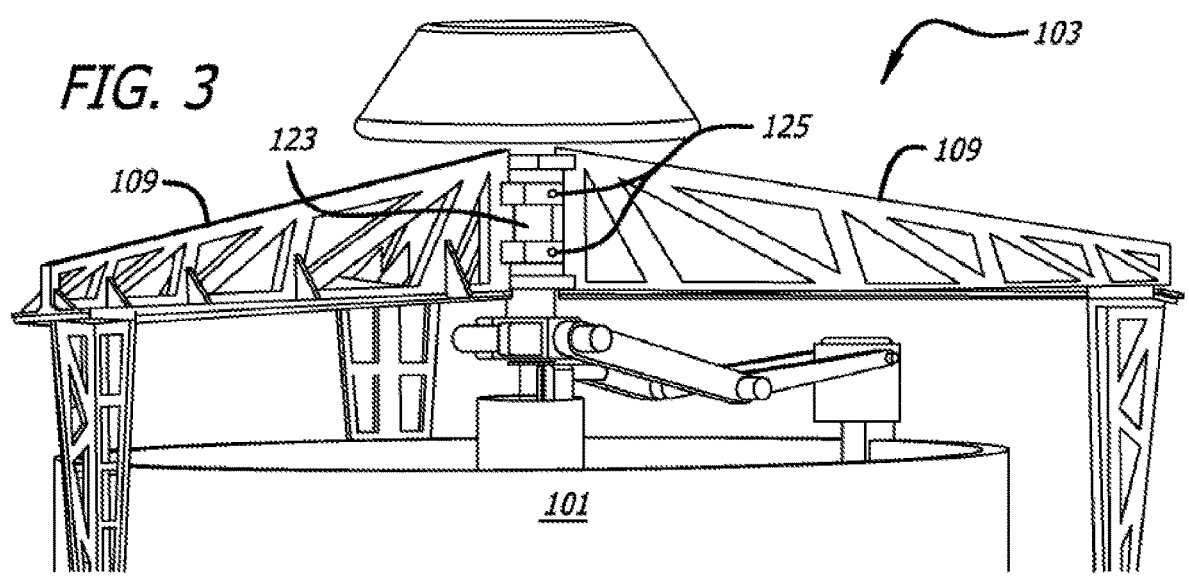
FIG. 3 illustrates an enlarged view of a portion of the tower and the robot and better illustrates how all but one of the horizontal trusses may rotate around the central vertical pole.

FIG. 3 illustrates an enlarged view of a portion of the tower 101 and the robot 103 and better illustrates how all but one of the horizontal trusses 109 may rotate around the central vertical pole 123. As illustrated in FIG. 2, all but one of the horizontal trusses may swivel around the central vertical pole 123. One of the horizontal trusses 109 may be locked onto the central vertical pole 123 with locking pins 125 to prevent free rotation of the central vertical pole 123. This may allow every rover 105 to freely move to either side of the tower 101 without exerting force on the other rovers 105. This freedom to move sideways may allow use of simple drive chain steering, as used in military tanks and bulldozers, to steer and keep the rovers 105 on course.

Figure 4:
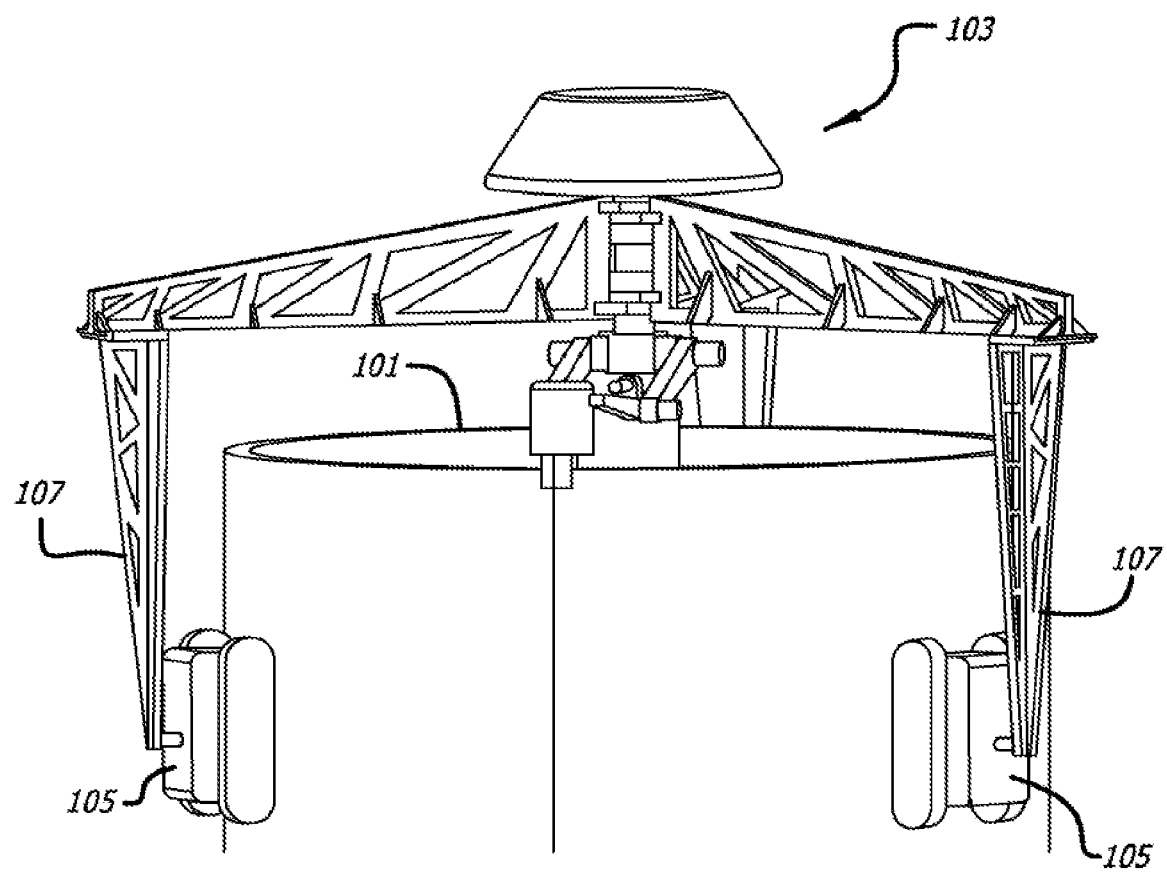
FIG. 4 illustrates an enlarged view of a portion of the tower and the robot and better illustrates connections between the rovers and the vertical trusses.

FIG. 4 illustrates an enlarged view of a portion of the tower 101 and the robot 103 and better illustrates connections between the rovers 105 and the vertical trusses 107. As illustrated in FIG. 4, the position of the connection point between the rovers 105 and the vertical trusses 107 may be such as to cause the greatest pressure that the rovers 105 assert on the tower 101 to be toward the lower side of the rovers, thus applying the greatest pressure on the areas of the tower 101 that have had the most time to cure.

The material to be extruded by the extrusion nozzle 111 may be delivered to the extrusion nozzle 111 in batches using a bucket that is moved up and down by a hoist.

Figure 5:
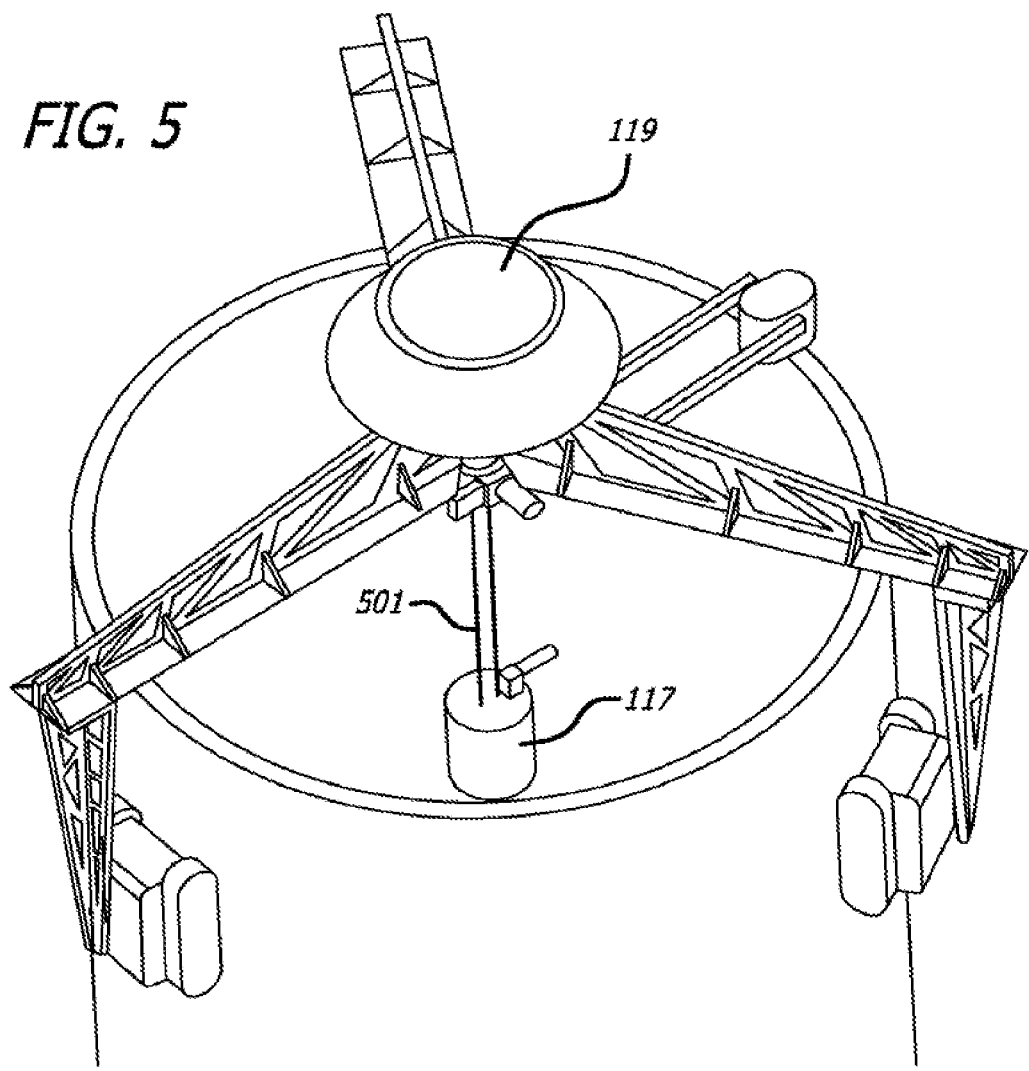
FIG. 5 illustrates an enlarged view of a portion of the tower and the robot and better illustrates the functioning of the bucket (i.e., the material container).

FIG. 5 illustrates an enlarged view of a portion of the tower 101 and the robot 103 and better illustrates the functioning of the bucket 117. A winch operating as a hoist may be in the component compartment 119. The winch, under the control of the controller, may extend a hoist cable 501 that is connected to the bucket 117 when empty, thereby allowing the bucket 117 to return to ground where it may be filled with material to be extruded or swapped for another bucket which is full. As illustrated in FIG. 1, the base segment of the tower may include an opening 122 through which the material may be delivered to the bucket or through which a replacement bucket may be moved, following which the winch may be commanded to raise the filled bucket 117.

FIG. 6A and FIG. 6B illustrate details of an example of the bucket 117 show in FIG. 5 with a portion of its side wall cut away to reveal an interior view. FIG. 6A illustrates the bucket 117 with a piston 601 at its bottom, while FIG. 6B illustrates the bucket 117 with the piston 601 mid way up.

As shown in FIG. 6A, the piston 601 may act as the bottom of the bucket 117 when the bucket is being filled. The bucket may be filled though an inlet/outlet pipe 603. The piston 601 may later be raised within the bucket 117 to empty the material in the bucket 117 by forcing it out of the inlet/outlet pipe 603.

Under the control of the controller, a solenoid may cause a pin 605 to lock the hoist cable 501 to the bucket 117 after the bucket is full and while the bucket 117 is being raised to the top of the tower 101 by the hoist, thus preventing the piston from rising within the bucket 117 during the hoist. Once the bucket 117 has reached the top of the tower 101, the controller may command the solenoid to cause the pin 605 to unlock the hoist cable 501 from the bucket 117. Further upward pulling on the hoist cable 501 by the hoist under the control of the controller may then force material within the bucket 117 to exit the input/output pipe 603. This may empty the bucket 117 by forcing the piston 601 to rise within the bucket 117 until it ultimately reaches the top of the bucket 117. With this configuration, the hoist performs both bucket transport and material pumping functions.

In lieu of transporting uncured material by buckets, the material may instead be delivered to the extrusion nozzle 111 though a long hose or by any other means.

Figure 7A:
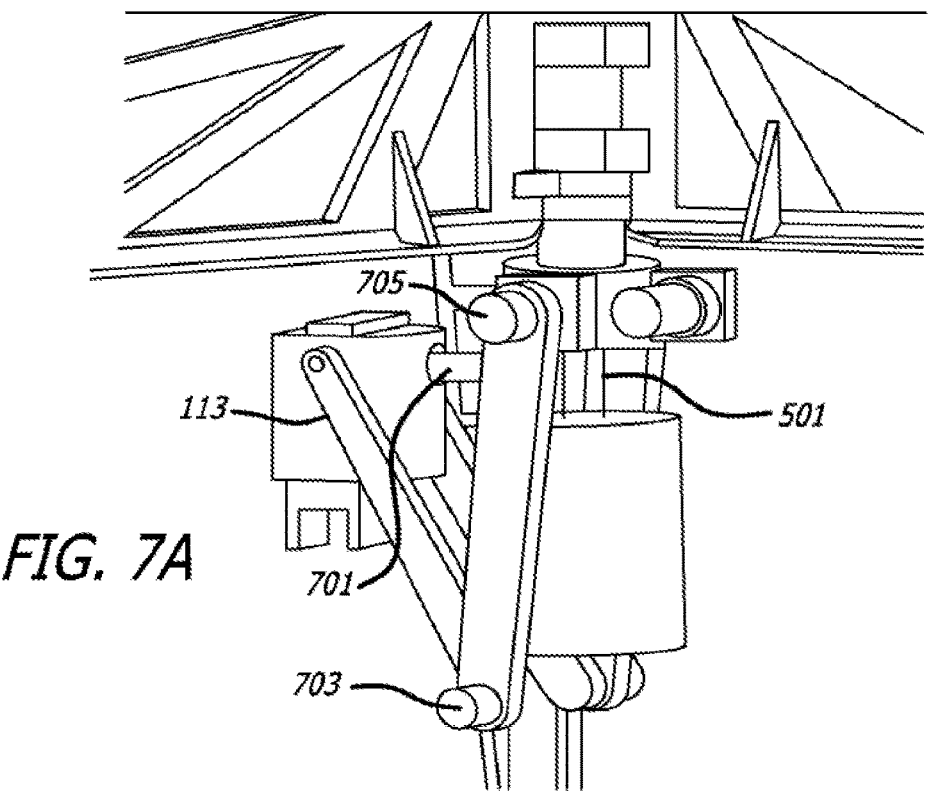
FIGS. 7A and 7B show enlarged views of a portion of the tower and the robot and show different views of the extrusion nozzle tank being filled.
Figure 7B:
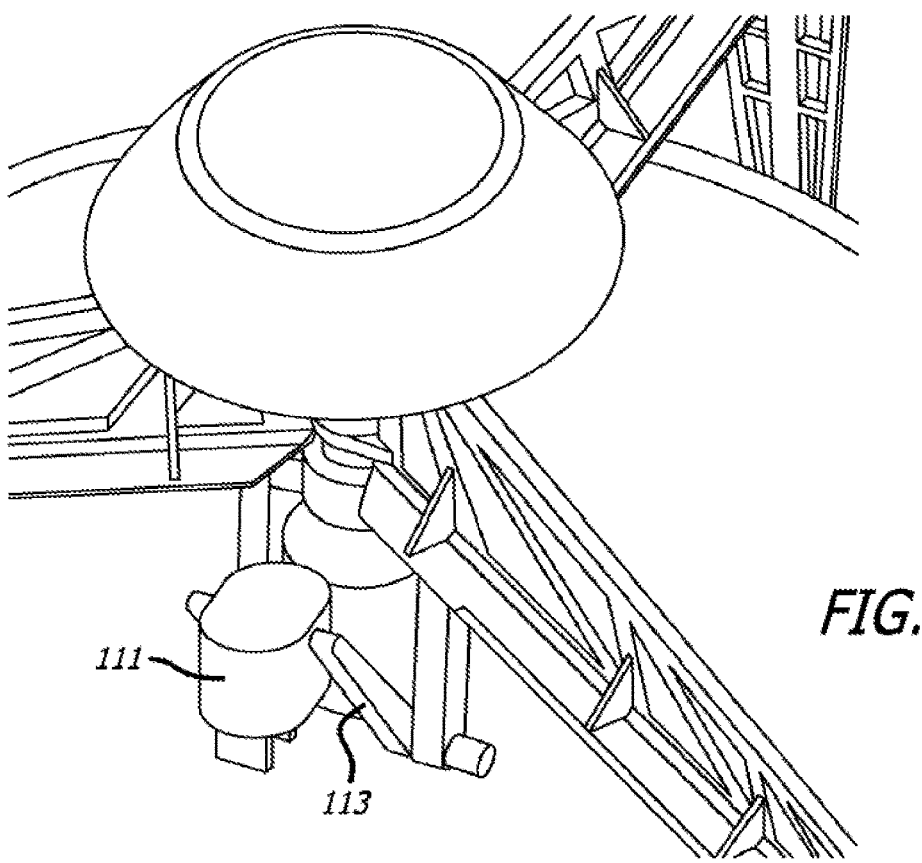

FIGS. 7A and 7B show enlarged views of a portion of the tower 101 and the robot 103 and show different views of the extrusion nozzle 111 being filled. As illustrated in these figures, the articulated arm 113 under the control of the controller may move the extrusion nozzle 111 so that the input/output pipe 603 of the bucket 117 enters an inlet opening 701 at the top of the extrusion nozzle 111 before the solenoid causes the pin 605 to unlock the bucket 117 from the hoist cable 501 of the hoist. The hoist may then again pull on the hoist cable 501, thus causing the material within the bucket 117 to leave the bucket 117 and enter the material storage compartment of the extrusion nozzle 117. As indicated above, the articulated arm 113 under the control of the controller may also rotate around the central pole and thus cause this extrusion nozzle 117 to extrude an additional layer of material on the upper rim of the tower 101. As indicated in FIG. 7A, the articulated arm 113 may be controlled by one or more servo motors, such as servo motors 703 and 705.

Figure 8A:
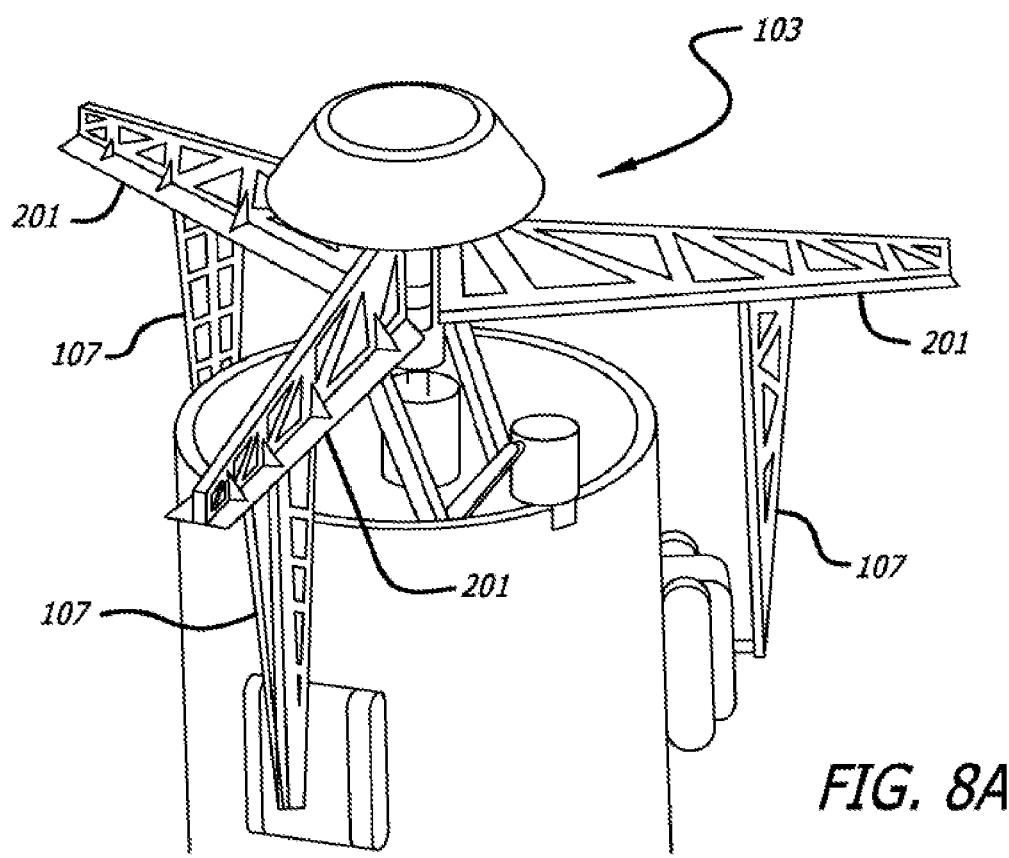
FIGS. 8A, 8B and 8C show enlarged views of a portion of the tower and the robot and show an example of construction at higher elevations at which the vertical trusses may be pulled inward toward the center pole by the cables to compensate for vertical taper in the walls of the tower 101 when present.
Figure 8B:
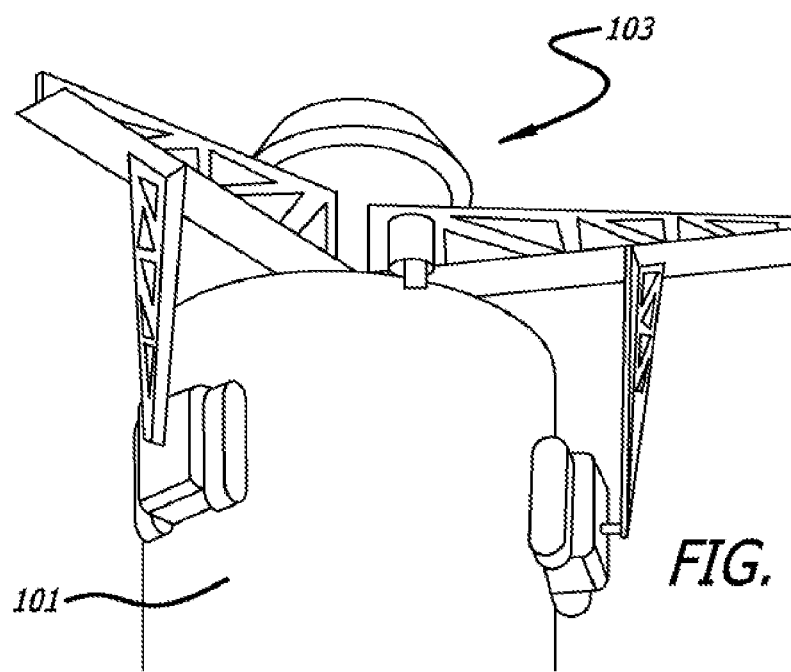

FIGS. 8A and 8B show enlarged views of a portion of the tower 101 and the robot 103 and show an example of construction at higher elevations at which the vertical trusses may be pulled inward toward the center pole by the cables 201 to compensate for vertical taper in the walls of the tower 101 when present.

Figure 8C:
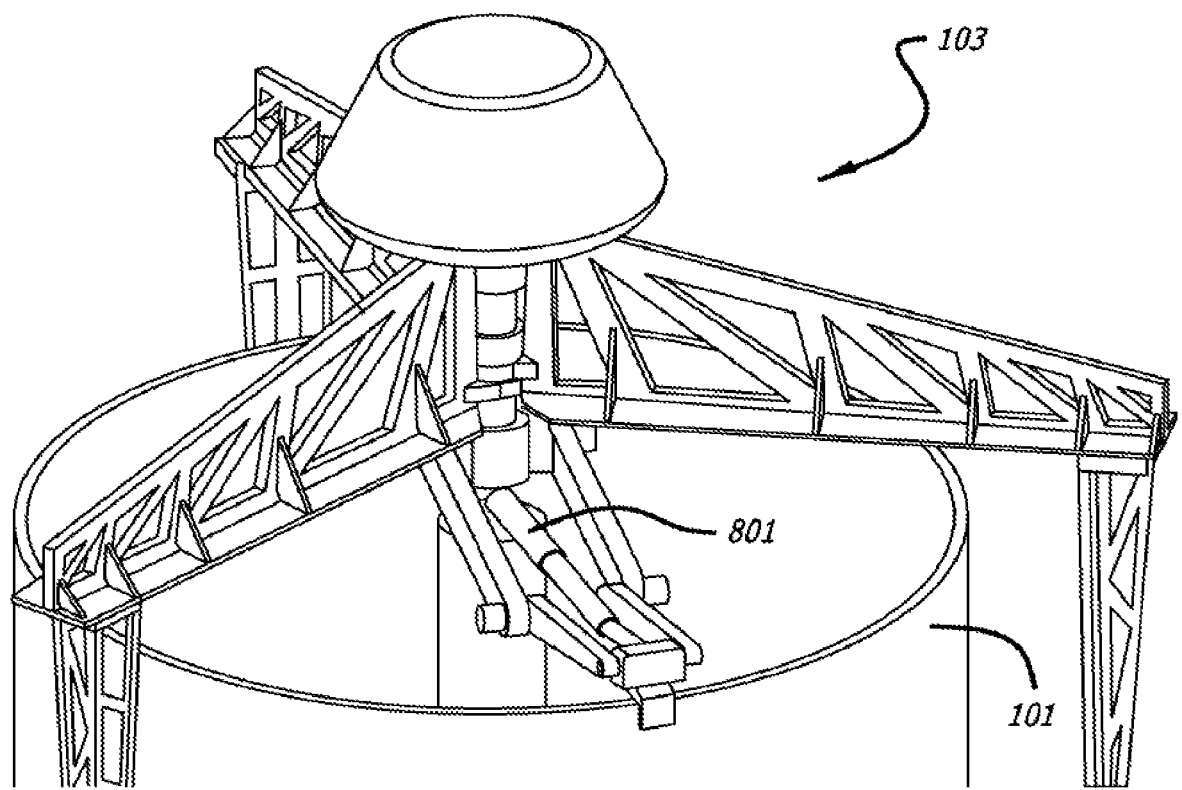

An alternative way of delivering the material from the bucket 117 to the extrusion nozzle 111 may be through a telescoping tube 801, as shown in FIG. 8C, that may operate under the control of the controller. In this configuration, the extrusion nozzle 111 may be a passive mechanism, as it may not need to have active pumping capability. The material in this configuration may still be pumped to the extrusion nozzle 111 by raising the piston 601, as illustrated in FIG. 6 and described above.

Figure 9:
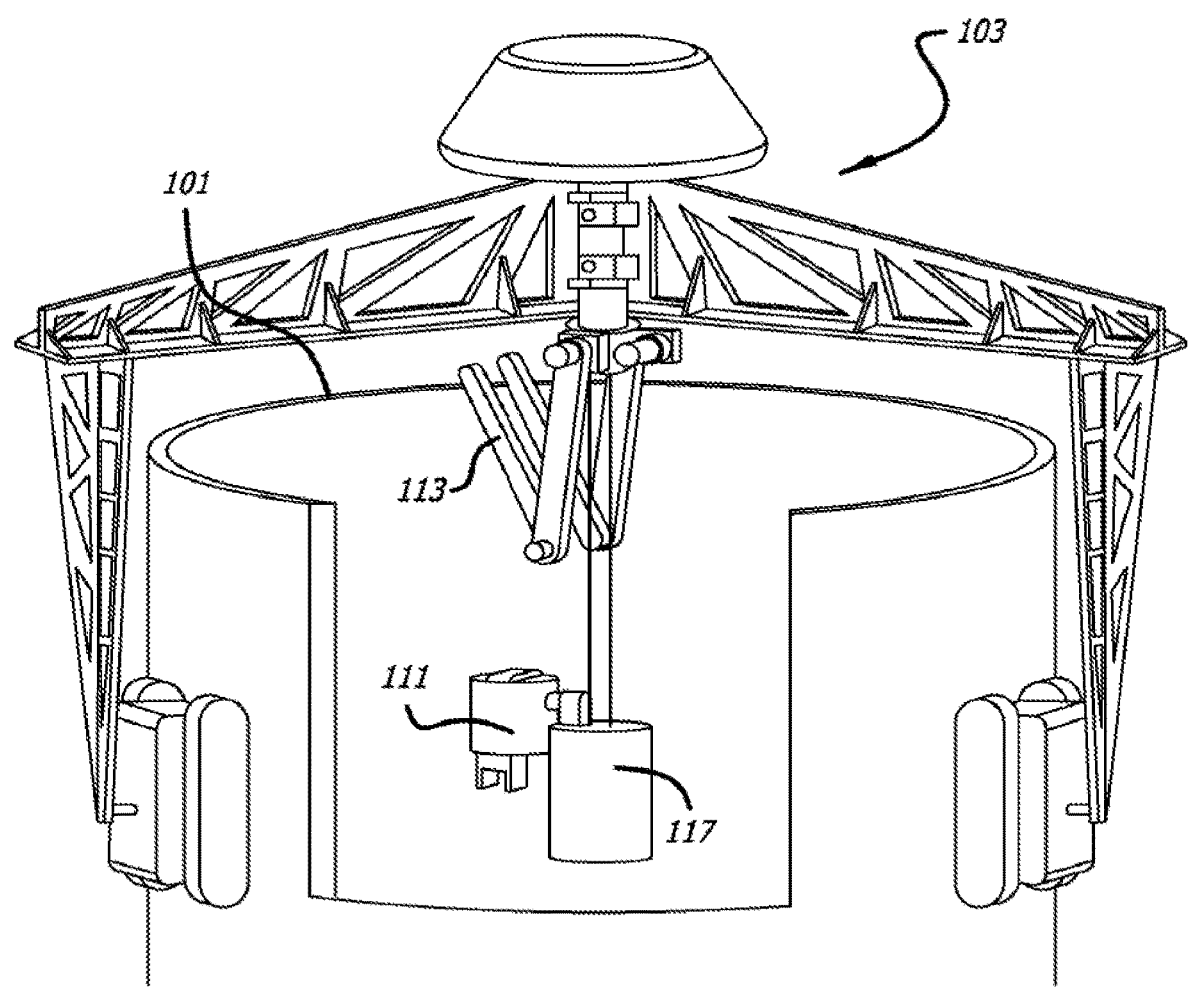
FIG. 9 shows an enlarged view of a cut-away portion of the tower and the robot and illustrates an example of a procedure for bringing down the nozzle for servicing it.

FIG. 9 shows an enlarged view of a cut-away portion of the tower 101 and the robot 103 and illustrates an example of a procedure for servicing the extrusion nozzle 111. In case the extrusion nozzle 111 needs service, such as if material is accidentally cured within the extrusion nozzle 111 or one of its components fails, the controller may cause the extrusion nozzle 111 to disengage from the articulated arm 113 after the articulated arm 113 causes the extrusion nozzle 111 to attach to the input/output pipe 603. The extrusion nozzle 111 may then be slowly lowered to ground by lowering the bucket 117 using the hoist. The extrusion nozzle 111 may then be repaired or replaced. The repaired or replaced extrusion nozzle may then be raised by raising the bucket 117 with the hoist and, upon reaching the top, rejoined to the articulated arm 113, again under the control of the controller. The extrusion process may then be resumed by the controller.

The hoist that transports the bucket 117 may also be used to hoist a repairman in a cage, in case the presence of a human operator is needed to fix or replace a component of the system.

Figure 10A:
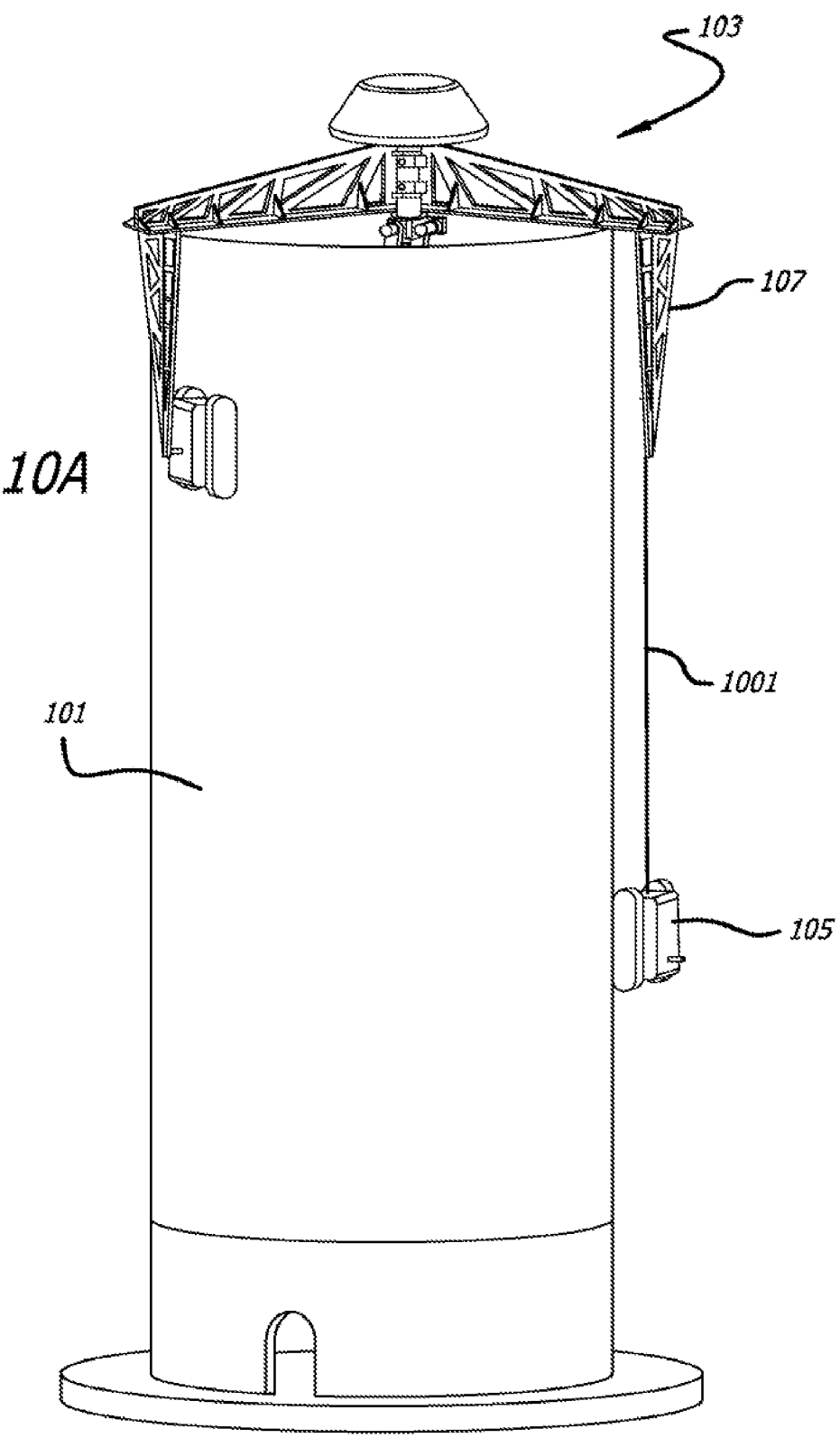
FIG. 10A shows the tower and the robot, including a hoist cable that may be used in association with a winch to lower one of the rovers to ground for possible service.

FIG. 10A shows the tower 101 and the robot 103, including a hoist cable 1001 that may be used in association with a winch to lower one of the rovers 105 to ground for possible service. Prior to descent, the rover 105 may be disengaged from the vertical trusses 107 under the control of the controller. The other rovers 105 may be lowered concurrently in the same way.

Figure 10B:
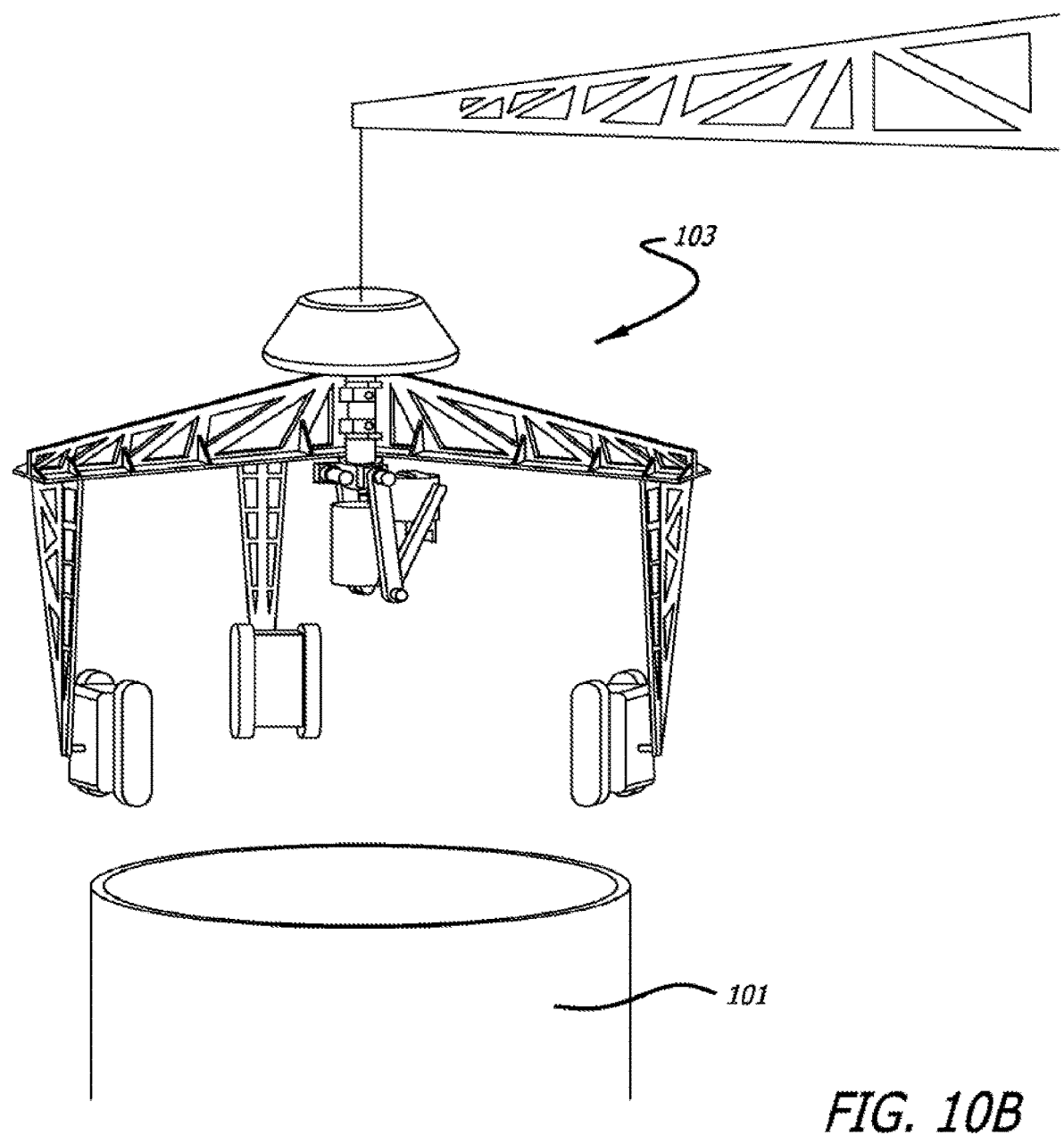
FIG. 10B shows lifting the entire robot with a crane, either for service purposes or after completion of the tower.

FIG. 10B shows lifting the entire robot 103 with a crane, either for service purposes or after completion of the tower.

FIGS. 11 and 12 show an alternate approach for sending an operator to the top of the tower for possible servicing of various system components inside of the tower. In this configuration, a cable 1101 may be attached to one of the horizontal trusses 109 as shown in FIG. 11. A weight 1103 may be attached to the cable 1101 which can be released to fall down by means of a remotely operated latch. The other end 1105 of the cable 1101 may hang down all the way to the ground where it may be connected to a free-turning spool. When a serviceman is needed on top, the weight may be remotely released and may bring down the cable 1101 inside the tower 101. This may be done when the ground end 1105 of the cable is pulled and released to disengage the latch (not shown) that holds the weight 1103.

When the cable is at ground level inside the tower 101, it may be connected to a cage 1201 and its other end 1105 (which may be outside the tower 101) may be pulled by a winch to lift the cage 1201, as illustrated in FIG. 12. Each of the horizontal trusses 109 may be equipped with the same type of double pulley and cable set to make it possible to send the cage 1201 to any of the sections on top.

FIGS. 13A and 13B illustrates an example of a tower 1301 that has been completed using the robot 103 (not shown in FIG. 13) and that has tensioning cables attached to it, an example of which is tensioning cable 1303. FIG. 13A illustrates the entire tower 1301, while FIG. 13B illustrates a close-up of the top portion. After extrusion of the tower 1301 is complete and the structure has fully cured, a ring 1305 with attached cables, such as the cable 1303, may be placed on top of the constructed tower using a crane or a helicopter. For post construction tensioning of the tower, once the ring is installed, the lower ends of the cables may be anchored to a concrete floor (foundation) inside of the tower and then tensioned by stretching. As an advantage over steel reinforcement inside concrete, the tension cables may be accessible for inspection and maintenance (e.g., periodic painting for protection against corrosion).

Multiple stages of reinforcement may be used in the course of tower construction with multiple steel rings at different tower elevations. Cable tensioning may be performed between adjacent rings or along the entire tower or for overlapping cable sections.

FIGS. 14A-14C illustrate arrangements that may be used to support the tower by guy wires as it is being constructed in the presence of a strong wind. While being constructed, the tower may not be reinforced by tension cables and thus may be in its weakest tensile strength state. In case of extreme wind speed (as in storms), freshly built sections of the tower may break under the force of the wind. As a precaution, the arrangements shown in FIGS. 14A-14C may be used.

In this arrangement, each rover 105 may carry one or more wooden or polymeric logs 1401 through which may be threaded strong cables or ropes 1403. When the rovers 105 reach a desired height, loose ends 1405 of the cables or ropes 1403 that are hanging down all the way to the ground may be pulled to tighten their loop around the tower. The ends 1405 of the cables may then be tied down to anchors on the ground to form guy wires. The rovers may then release the cables or ropes under the control of the controller and may continue to climb upward as the construction of the rest of the tower proceeds. This may secure the tower by guy wires during construction, which may protect the tower against high forces of a possible storm.

The towers that are extruded by the robot 103 may have a variety of shapes. For example, the towers may be cylindrical, pyramids with various numbers of sides (e.g., 3, 4, or 5), cones with elliptical cross section, or any other shape. The controller need merely be programmed to effectuate the desired shape.

The initial portion of the tower 101, which may provide a starting climbing structure for the rovers, may be built using other approaches. For example, the rovers 105 and the vertical trusses 107 may initially be removed. In this configuration, a vertical pole may instead be attached to outside ends of each of the horizontal trusses 107 and stably rested on the ground around the base. Each pole may have a motorized lift system on which the end of a horizontal truss 109 may rest. This may enable the entire robot 103 to be lifted from the ground level to the top of the base while the nozzle builds the base structure in a layer-wise fashion.

Figure 15:
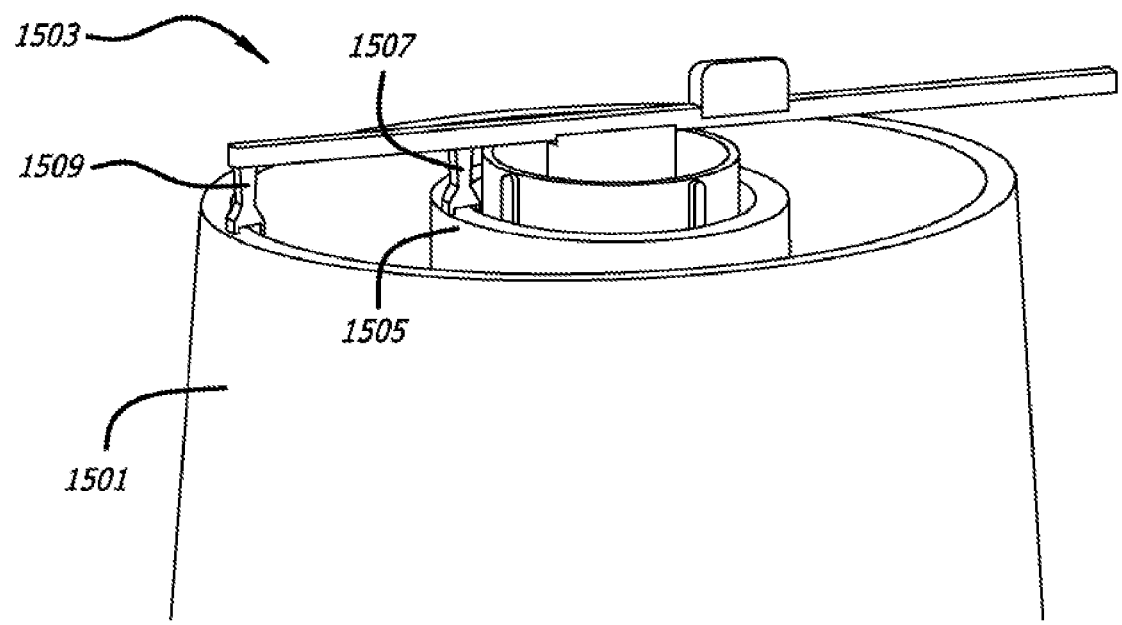
FIGS. 15-17 illustrate an example of a tower being constructed by another type of robot.
Figure 16:
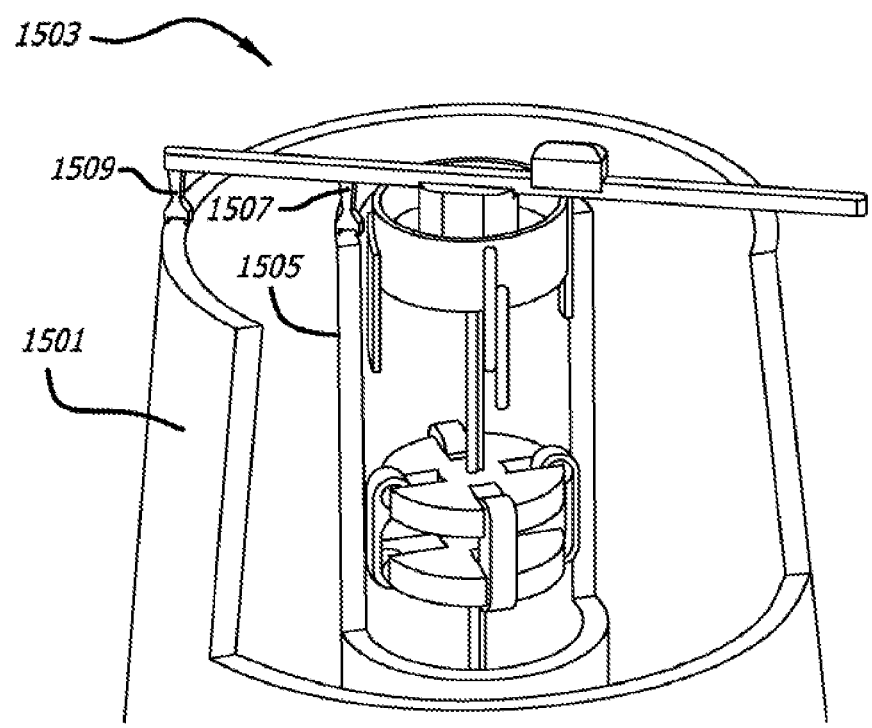
Figure 17:
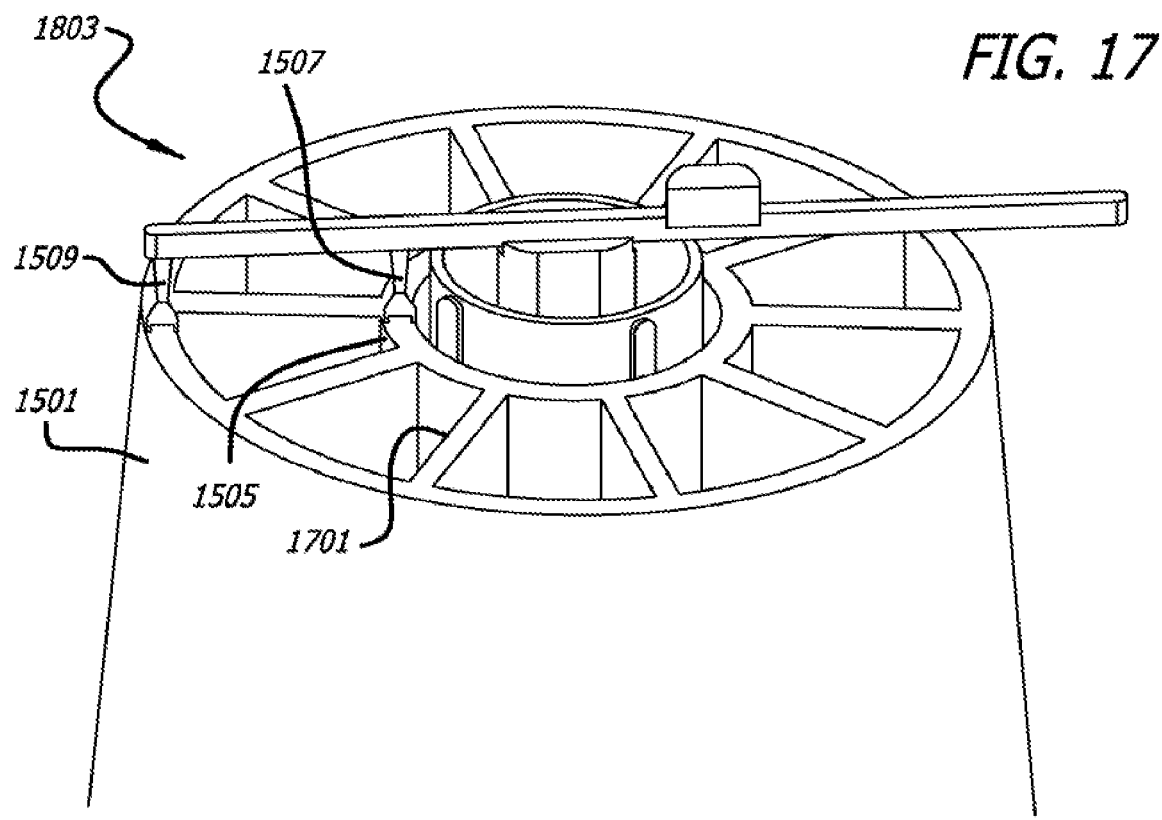

FIGS. 15-17 illustrate an example of a tower 1501 being constructed by another type of robot 1503. In this approach, the robot 1503 may be configured to climb inside of the tower 1501, rather than outside of it. To make internal climbing possible, a cylinder 1505 (or other cross-sectional shape) with a smaller diameter than the diameter of the base of the tower being constructed may get extruded by an extrusion nozzle 1507, as the tower 1501 is extruded by an extrusion nozzle 1509. The two extrusion nozzles 1507 and 1509 may concurrently extrude material to build both the tower and the internal cylindrical structure simultaneously.

The robot 1503 may climb by pressing three or more sets of rotating drive tracks 1511 outwardly against the internal wall of the cylinder structure. All other aspects of the robot 1503 may be the same as those described above in connection with the robot 103. Material delivery can also be done by the same batch method described earlier.

Various structures may be extruded by either or both of the extrusion nozzles 1507 and 1509 to secure the position of the interior cylinder 1505. For example, and as illustrated in FIG. 17, rib spacers, such as a rib spacer 1701, may be extruded in the interior of the tower 1501. The controller may be configured to command the extrusion of these spacers as well.

In a still further configuration, no additional interior structure may be provided. Instead, the rovers 105 may be oriented to press outwardly against and to crawl up the interior wall of the tower during construction.

As indicated, the robot may include an electronic controller that is configured to control and to effectuate all of the functions of the extrusion nozzles, the vertical trusses, the horizontal trusses, the buckets, and the hoists, as discussed herein. The electronic controller may be located within the component compartment 119, at another location on the robot, or elsewhere. The electronic controller may be configured to communicate through electrical wires or wirelessly with each component that it controls. There may be appropriately located sensors, servos, other movement causing and/or detecting apparatus, or any combination of these, to implement the commands of the electronic controller and/or to detect the consequences of these commands so that the electronic controller may effectuate all operations in the desired manner.

The electronic controller may be implemented with a computer system configured to perform the functions that have been described herein for the electronic controller. The computer system may include one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Figure 18A:
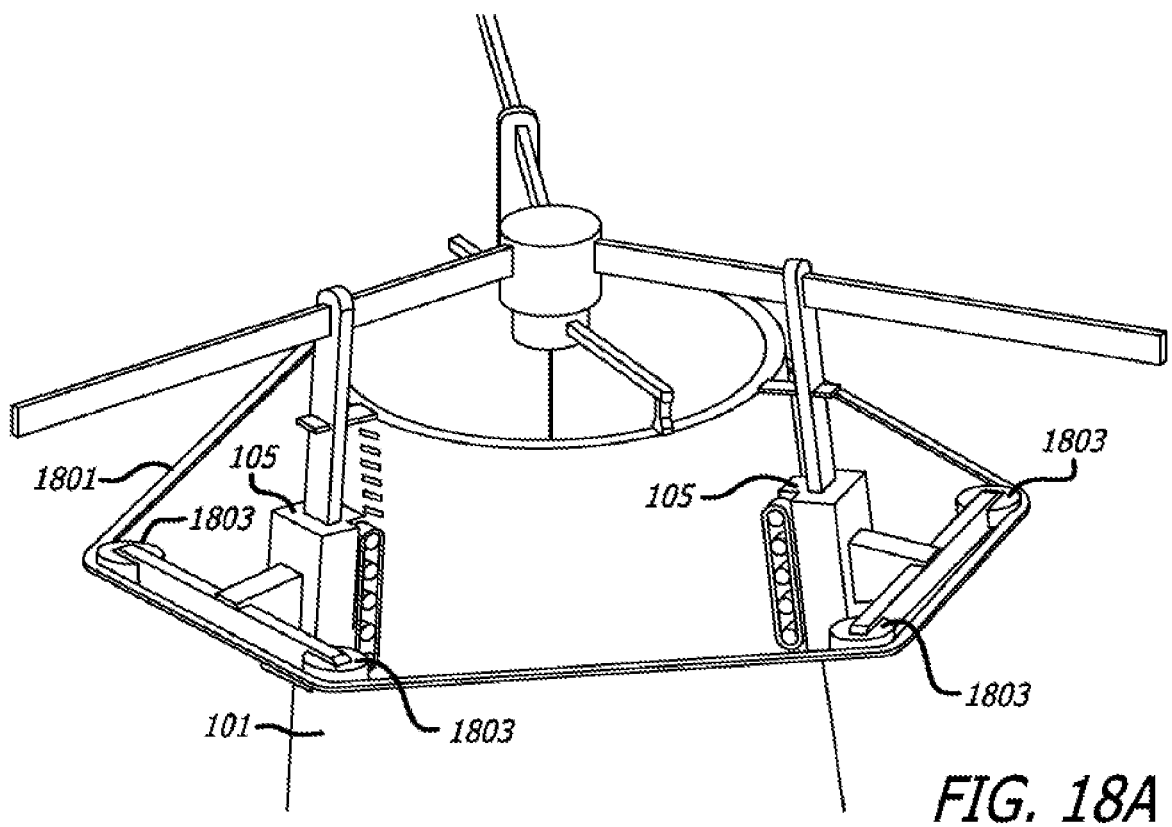
FIGS. 18A and 18B different views of a tower being constructed using rovers that are pressed against the tower by a cable that goes around them.
Figure 18B:
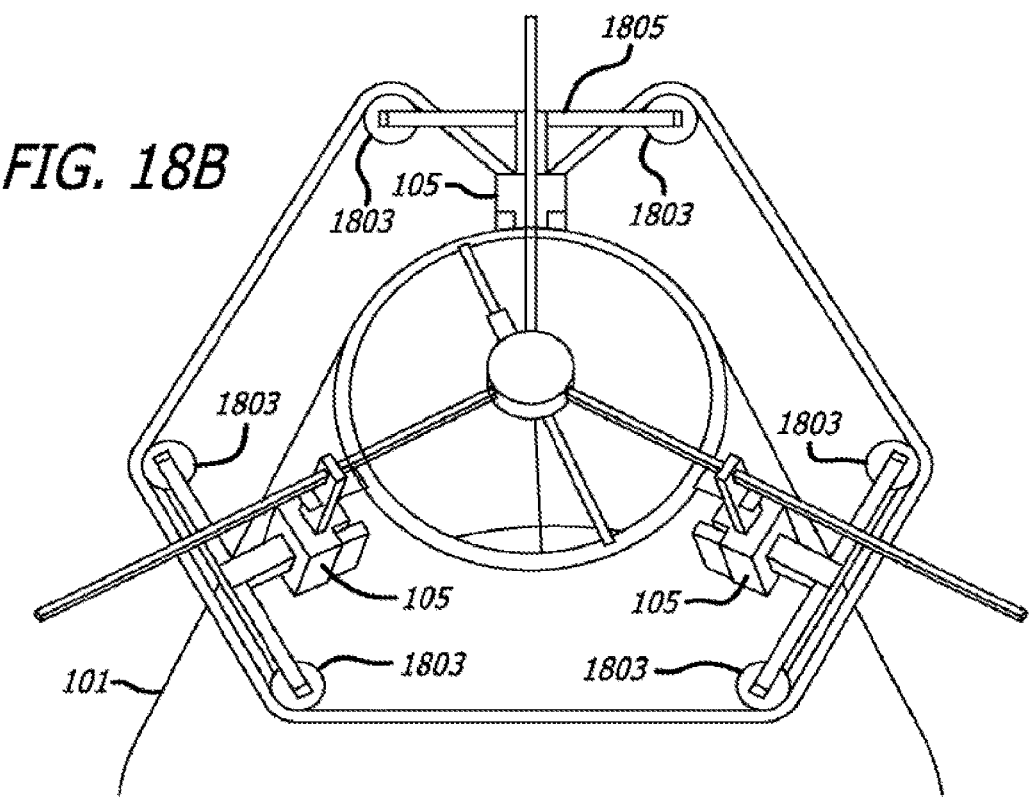

For example, and as illustrated in FIGS. 18A and 18B, the rovers 105 may be pressed against the tower 101 by means of a cable 1801 that goes around them and over pulleys 1803 attached to each rover. One of the rovers may have a winch 1805 that keeps the cable in tension as the system climbs a tapered tower.

Figure 19A:
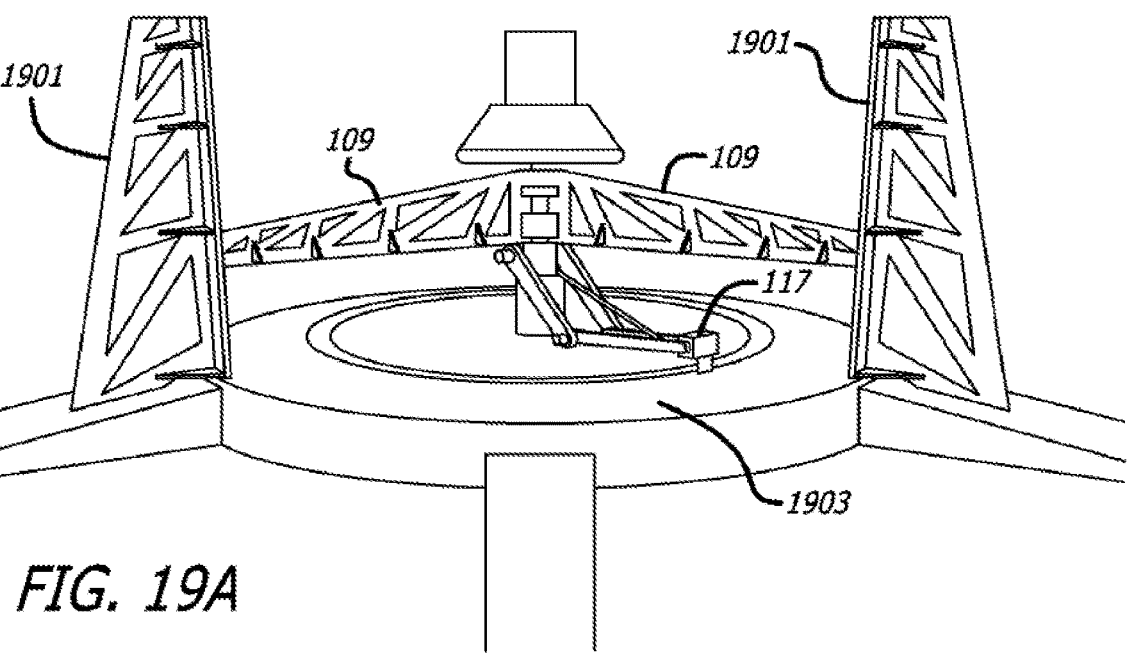
FIGS. 19A-19C illustrate a base construction process that may be used during the initial phase of the construction.
Figure 19B:
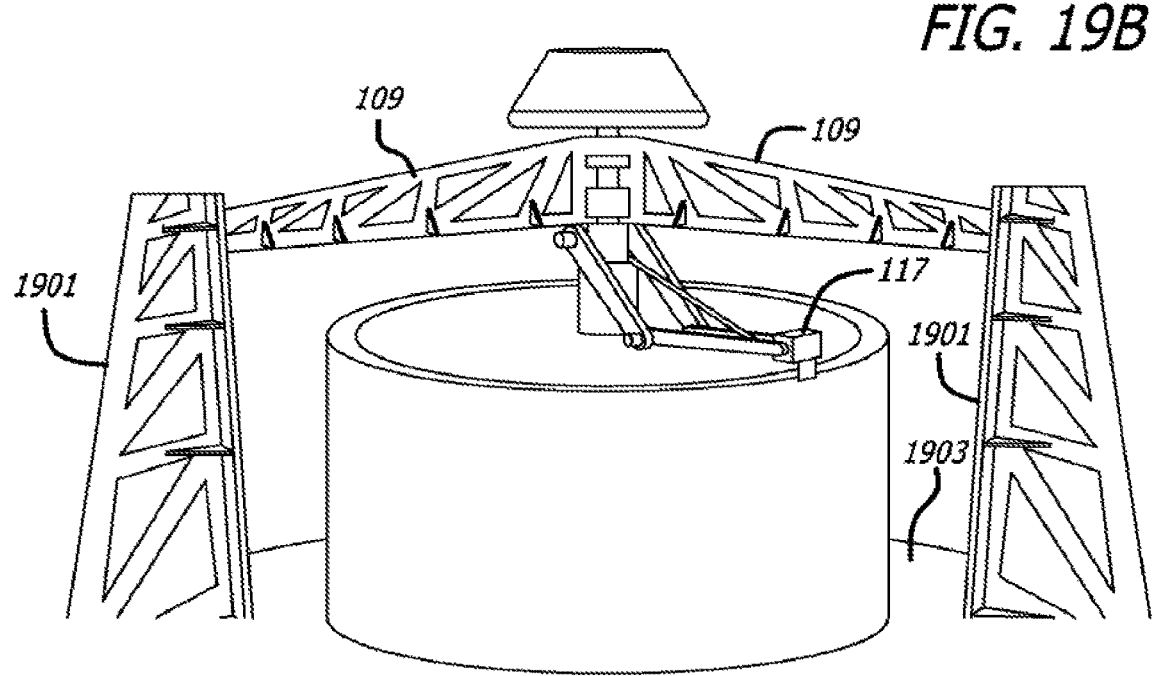
Figure 19C:
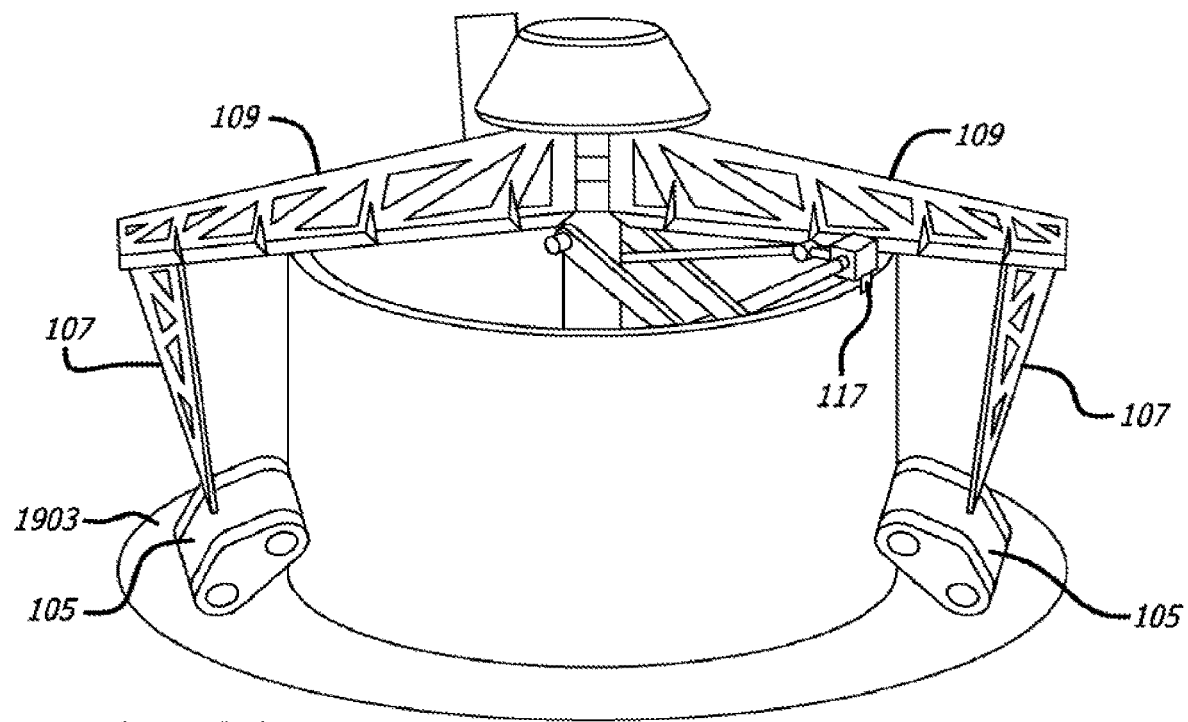

As illustrated in FIGS. 19A-19B, three vertical posts 1901 may be stably installed around a foundation 1903. The ends of horizontal trusses 109 may be slidably engaged in vertical tracks on the vertical posts 1901. Each vertical post 1901 may be equipped with a motorized lifting system to lift the horizontal truss 109 that it supports after each layer of the tower base is extruded by the extrusion nozzle 117, until the desired height of the base is reached. The vertical posts may then be taken away, the rovers 105 and the vertical trusses 107 that push the rovers 105 against the tower may be added, and construction beyond the base segment of the tower may continue, as shown in FIG. 19C and described above.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A method for forming a tower or column, the method comprising the steps of:
    positioning an extrusion nozzle adjacent to a portion of a tower under construction, wherein the extrusion nozzle is connected with a climbing apparatus that is configured to engage with and climb on one of a structure surface separate from the tower or column or a surface of the tower under construction;
    extruding a layer of uncured construction material through the extrusion nozzle to form a section of the portion of the tower;
    raising the climbing apparatus relative to the tower to form a next section of the portion of the tower through a subsequent extrusion step using the extrusion nozzle;
    aligning each layer of the tower under construction using a sensor comprising at least one of a Global Positioning System (GPS) sensor, an accelerometer, or a gyroscope; and
    repeating the positioning, extruding and raising steps until the tower under construction reaches a desired height.

2. The method as recited in claim 1 wherein during at least one instance of rising, the climbing apparatus engages a structure surface separate from the tower or column, and wherein the structure is disposed inside of the tower.

3. The method as recited in claim 2 wherein the structure disposed inside of the tower is a cylinder, and wherein during rising, the climbing apparatus engages a surface of the structure.

4. The method as recited in claim 1 wherein the extrusion nozzle is supported by the climbing apparatus to move with the climbing apparatus during the step of raising.

5. The method as recited in claim 1 wherein one or more steps of positioning, extruding and raising are conducted by a controller.

6. The method as recited in claim 1 wherein the climbing apparatus is positioned inside of the tower under construction.

7. The method as recited in claim 1 wherein the climbing apparatus is positioned outside of the tower under construction.

8. The method as recited in claim 1 wherein during repeating the step of extruding, a subsequent layer of the uncured construction material is disposed onto an earlier extruded layer of the uncured construction material.

9. The method as recited in claim 1 further comprising operating a material transfer apparatus to transfer uncured construction material from a material container to the extrusion nozzle.

10. A method for forming a tower or column, the method comprising the steps of:
    positioning an extrusion nozzle adjacent to a wall portion of a tower under construction, wherein the extrusion nozzle is connected with a climbing apparatus;
    extruding a layer of uncured construction material through the extrusion nozzle to form a section of the wall portion;
    moving the climbing apparatus to form a next section of the wall portion through a subsequent extrusion step using the extrusion nozzle, wherein during the moving step the extrusion nozzle moves with the climbing apparatus; and
    repeating the positioning, extruding and moving steps until the tower under construction reaches a desired height;
    wherein one or more of the steps of positioning, extruding and moving are conducted by a controller that is autonomously operated to direct the positioning of the nozzle to traverse one or more layers of previously extruded uncured construction material.

11. The method as recited in claim 10 wherein during the step of moving, the controller is autonomously operated to cause the climbing apparatus to climb an incremental amount relative to the tower after a layer of the uncured construction material has been extruded.

12. The method as recited in claim 10 wherein the climbing apparatus is positioned adjacent a structure inside of the tower to engage and move relative to the structure during the step of moving.

13. The method as recited in claim 12 wherein the structure is a cylinder and the climbing apparatus is disposed within the cylinder.

14. The method as recited in claim 12 further comprising extruding a layer of uncured construction material through a second extrusion nozzle to form a wall section of the structure.

15. The method as recited in claim 14 wherein the second extrusion nozzle is connected with the climbing apparatus to move therewith.

16. A method for forming a tower or column, the method comprising the steps of:
    positioning an extrusion nozzle adjacent to a wall portion of a tower under construction, wherein the extrusion nozzle is connected with a climbing apparatus to move therewith;
    extruding a layer of uncured construction material through the extrusion nozzle to form a section of the tower wall portion;
    elevating the climbing apparatus to form a next section of the tower wall portion during a subsequent extrusion step using the extrusion nozzle, wherein during the elevating step the extrusion nozzle moves with the climbing apparatus; and
    repeating the positioning, extruding and elevating steps until the tower under construction reaches a desired height;
    wherein the steps of positioning, extruding and elevating are conducted autonomously by a controller.

17. The method as recited in claim 16 wherein during the elevating step the climbing apparatus engages a section of the tower or a structure disposed within the tower, and wherein the climbing apparatus comprises one or more rovers having a rotating element to cause climbing apparatus movement relative to the tower or structure.

18. The method as recited in claim 16, further comprising aligning each layer of the tower under construction using a sensor comprising at least one of a Global Positioning System (GPS) sensor, an accelerometer, or a gyroscope.

* * * * *